(12) United States Patent
Ignatius et al.

(10) Patent No.: US 8,429,428 B2
(45) Date of Patent: *Apr. 23, 2013

(54) SYSTEM AND METHOD FOR PROVIDING ENCRYPTION IN STORAGE OPERATIONS IN A STORAGE NETWORK, SUCH AS FOR USE BY APPLICATION SERVICE PROVIDERS THAT PROVIDE DATA STORAGE SERVICES

(75) Inventors: Paul Ignatius, Duluth, GA (US); Anand Prahlad, East Brunswick, NJ (US); Mahesh Tyagarajan, San Jose, CA (US); Manoj Vijayan Retnamma, Ocean, NJ (US); Arun Amarendran, Bangalore (IN); Rajiv Kottomtharayil, Ocean, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 373 days.

This patent is subject to a terminal disclaimer.

(21) Appl. No.: 12/796,007

(22) Filed: Jun. 8, 2010

(65) Prior Publication Data
US 2010/0313039 A1    Dec. 9, 2010

Related U.S. Application Data

(63) Continuation of application No. 11/843,453, filed on Aug. 22, 2007, now Pat. No. 7,739,381, which is a continuation of application No. 10/990,284, filed on Nov. 15, 2004, now Pat. No. 7,277,941, which is a continuation-in-part of application No. 10/144,683, filed on May 13, 2002, now Pat. No. 7,401,154, which is a continuation of application No. 09/038,440, filed on Mar. 11, 1998, now Pat. No. 6,418, 478.

(60) Provisional application No. 60/519,526, filed on Nov. 13, 2003.

(51) Int. Cl.
*G06F 11/00* (2006.01)

(52) U.S. Cl.
USPC ................................... 713/193; 380/44

(58) Field of Classification Search .................. 713/189, 713/193, 171, 182; 380/44; 709/225, 229
See application file for complete search history.

(56) References Cited

U.S. PATENT DOCUMENTS 4,296,465 A    10/1981   Lemak
4,686,620 A    8/1987   Ng
(Continued)

FOREIGN PATENT DOCUMENTS

EP    0259912 A1    3/1988
EP    0405926 A2    1/1991
(Continued)

OTHER PUBLICATIONS

Armstead et al., "Implementation of a Campus-wide Distributed Mass Storage Service: The Dream vs. Reality," IEEE, 1995, pp. 190-199.

(Continued)

*Primary Examiner* — Samson Lemma
(74) *Attorney, Agent, or Firm* — Perkins Coie LLP

(57) ABSTRACT

In accordance with embodiments of the invention, a method is provided for performing a storage operation in a pipeline storage system in which one or more data streams containing data to be stored are written into data chunks. The method includes generating an encryption key associated with a first archive file to be stored when encryption is requested for the storage operation, encrypting the archive data from the data stream using the encryption key to create an encrypted data chunk when a data stream containing the archive file is processed in the pipeline storage system, storing the encrypted data chunk on a storage medium, and storing the encryption key in a manner accessible during a restore operation of the encrypted data chunk.

16 Claims, 13 Drawing Sheets

U.S. PATENT DOCUMENTS

| | | |
|---|---|---|
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,351 A | 4/1994 | Jippo et al. |
| 5,311,509 A | 5/1994 | Heddes et al. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,448,724 A | 9/1995 | Hayashi |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,559,991 A | 9/1996 | Kanfi |
| 5,598,546 A | 1/1997 | Blomgren |
| 5,619,644 A | 4/1997 | Crockett et al. |
| 5,638,509 A | 6/1997 | Dunphy et al. |
| 5,673,381 A | 9/1997 | Huai et al. |
| 5,682,513 A | 10/1997 | Candelaria et al. |
| 5,699,361 A | 12/1997 | Ding et al. |
| 5,729,743 A | 3/1998 | Squibb |
| 5,751,997 A | 5/1998 | Kullick et al. |
| 5,752,041 A | 5/1998 | Fosdick |
| 5,758,068 A | 5/1998 | Brandt et al. |
| 5,758,359 A | 5/1998 | Saxon |
| 5,761,677 A | 6/1998 | Senator et al. |
| 5,761,734 A | 6/1998 | Pfeffer et al. |
| 5,764,972 A | 6/1998 | Crouse et al. |
| 5,778,395 A | 7/1998 | Whiting et al. |
| 5,805,920 A | 9/1998 | Sprenkle et al. |
| 5,812,398 A | 9/1998 | Nielsen |
| 5,813,009 A | 9/1998 | Johnson et al. |
| 5,813,017 A | 9/1998 | Morris |
| 5,860,104 A | 1/1999 | Witt et al. |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,950,205 A | 9/1999 | Aviani, Jr. |
| 5,956,519 A | 9/1999 | Wise et al. |
| 5,970,233 A | 10/1999 | Liu et al. |
| 5,970,255 A | 10/1999 | Tran et al. |
| 5,974,563 A | 10/1999 | Beeler, Jr. |
| 5,999,629 A | 12/1999 | Heer et al. |
| 6,003,089 A | 12/1999 | Shaffer et al. |
| 6,009,274 A | 12/1999 | Fletcher et al. |
| 6,012,090 A | 1/2000 | Chung et al. |
| 6,021,415 A | 2/2000 | Cannon et al. |
| 6,026,414 A | 2/2000 | Anglin |
| 6,052,735 A | 4/2000 | Ulrich et al. |
| 6,076,148 A | 6/2000 | Kedem |
| 6,094,416 A | 7/2000 | Ying |
| 6,094,684 A | 7/2000 | Pallmann |
| 6,105,129 A | 8/2000 | Meier et al. |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,169,976 B1 | 1/2001 | Colosso |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,292,783 B1 | 9/2001 | Rohler et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,381,331 B1 | 4/2002 | Kato |
| 6,389,432 B1 | 5/2002 | Pothapragada et al. |
| 6,418,478 B1 | 7/2002 | Ignatius et al. |
| 6,421,711 B1 | 7/2002 | Blumenau et al. |
| 6,487,561 B1 | 11/2002 | Ofek et al. |
| 6,519,679 B2 | 2/2003 | Devireddy et al. |
| 6,538,669 B1 | 3/2003 | Lagueux, Jr. et al. |
| 6,542,972 B2 | 4/2003 | Ignatius et al. |
| 6,564,228 B1 | 5/2003 | O'Connor |
| 6,577,734 B1 * | 6/2003 | Etzel et al. .................... 380/277 |
| 6,604,149 B1 | 8/2003 | Deo et al. |
| 6,654,825 B2 | 11/2003 | Clapp et al. |
| 6,658,526 B2 | 12/2003 | Nguyen et al. |
| 6,772,332 B1 | 8/2004 | Boebert et al. |
| 6,898,286 B2 | 5/2005 | Murray |
| 6,973,621 B2 | 12/2005 | Sie et al. |
| 7,035,880 B1 | 4/2006 | Crescenti et al. |
| 7,130,970 B2 | 10/2006 | Devassy et al. |
| 7,209,972 B1 | 4/2007 | Ignatius et al. |
| 7,213,269 B2 | 5/2007 | Orthlieb et al. |
| 7,277,941 B2 | 10/2007 | Ignatius et al. |
| 7,287,045 B2 | 10/2007 | Saika et al. |
| 7,315,923 B2 | 1/2008 | Retnamma et al. |
| 7,320,068 B2 | 1/2008 | Zimniewicz et al. |
| 7,328,189 B2 | 2/2008 | Ling |
| 7,360,252 B1 | 4/2008 | Torrubia-Saez et al. |
| 7,389,273 B2 | 6/2008 | Irwin et al. |
| 7,395,282 B1 | 7/2008 | Crescenti et al. |
| 7,401,154 B2 | 7/2008 | Ignatius et al. |
| 7,506,102 B2 | 3/2009 | Lev-Ran et al. |
| 7,519,827 B2 | 4/2009 | Anderson et al. |
| 7,581,077 B2 | 8/2009 | Ignatius et al. |
| 7,627,569 B2 | 12/2009 | Gafter |
| 7,627,776 B2 | 12/2009 | Petruzzo |
| 7,739,381 B2 | 6/2010 | Ignatius et al. |
| 7,748,027 B2 | 6/2010 | Patrick |
| 7,761,713 B2 | 7/2010 | Baar |
| 7,805,600 B2 | 9/2010 | Bucher et al. |
| 7,818,262 B2 | 10/2010 | Kavuri et al. |
| 7,840,537 B2 | 11/2010 | Gokhale et al. |
| 7,882,315 B2 | 2/2011 | Tsai et al. |
| 8,108,427 B2 | 1/2012 | Prahlad et al. |
| 8,131,648 B2 | 3/2012 | Barton |
| 2002/0007347 A1 | 1/2002 | Blumenthal et al. |
| 2002/0007351 A1 | 1/2002 | Hillegass et al. |
| 2002/0077988 A1 | 6/2002 | Sasaki et al. |
| 2002/0120726 A1 | 8/2002 | Padole et al. |
| 2002/0128976 A1 | 9/2002 | O'Connor et al. |
| 2002/0147734 A1 | 10/2002 | Shoup et al. |
| 2002/0174011 A1 | 11/2002 | Sanchez et al. |
| 2003/0005428 A1 | 1/2003 | Roman |
| 2003/0200104 A1 | 10/2003 | Heming et al. |
| 2004/0093229 A1 | 5/2004 | Plain |
| 2004/0210509 A1 | 10/2004 | Eder |
| 2004/0249759 A1 | 12/2004 | Higashi et al. |
| 2004/0255143 A1 | 12/2004 | Wemyss et al. |
| 2005/0027657 A1 | 2/2005 | Leontiev et al. |
| 2005/0091655 A1 | 4/2005 | Probert et al. |
| 2005/0097440 A1 | 5/2005 | Lusk et al. |
| 2005/0108526 A1 | 5/2005 | Robertson |
| 2006/0224846 A1 | 10/2006 | Amarendran et al. |
| 2006/0242296 A1 | 10/2006 | Woolard et al. |
| 2007/0198421 A1 | 8/2007 | Muller et al. |
| 2007/0198422 A1 | 8/2007 | Prahlad et al. |
| 2008/0005380 A1 | 1/2008 | Kawasaki et al. |
| 2008/0091747 A1 | 4/2008 | Prahlad et al. |
| 2008/0229037 A1 | 9/2008 | Bunte et al. |
| 2008/0243795 A1 | 10/2008 | Prahlad et al. |
| 2008/0307020 A1 * | 12/2008 | Ko et al. ................. 707/204 |
| 2008/0320319 A1 | 12/2008 | Muller et al. |

| | | | |
|---|---|---|---|
| 2009/0222907 | A1 | 9/2009 | Guichard |
| 2009/0319534 | A1 | 12/2009 | Gokhale |
| 2009/0319585 | A1 | 12/2009 | Gokhale |
| 2010/0031017 | A1 | 2/2010 | Gokhale et al. |
| 2010/0242096 | A1 | 9/2010 | Varadharajan et al. |
| 2012/0023140 | A1 | 1/2012 | Prahlad et al. |

FOREIGN PATENT DOCUMENTS

| | | |
|---|---|---|
| EP | 0467546 A2 | 1/1992 |
| EP | 0774715 A1 | 5/1997 |
| EP | 0809184 A1 | 11/1997 |
| EP | 0862304 A2 | 9/1998 |
| EP | 0899662 A1 | 3/1999 |
| EP | 0981090 A1 | 2/2000 |
| WO | WO-9513580 A1 | 5/1995 |
| WO | WO-9839707 A1 | 9/1998 |
| WO | WO-9912098 A1 | 3/1999 |

OTHER PUBLICATIONS

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," IEEE, 1994, pp. 124-126.

Jander, M., "Launching Storage-Area Net," Data Communications, US, McGraw Hill, NY, vol. 27, No. 4 (Mar. 21, 1998), pp. 64-72.

Jason Gait, "The Optical File Cabinet: A Random-Access File System for Write-Once Optical Disks," IEEE Computer, vol. 21, No. 6, pp. 11-22 (1988) (see in particular figure 5 in p. 15 and recitation in claim 5).

PCT International Search Report for Application No. PCT/US01/02931, Mar. 6, 2002.

Rosenblum et al., "The Design and Implementation of a Log-Structured File System," Operating Systems Review SIGPOPS, vol. 25, No. 5, New York, US, pp. 1-15 (May 1991).

"Associate", Collins English Dictionary, London: Collins, 2000, Credo Reference online)[retrieved on Jul. 30, 2009], available at <http://wNw.credoreference.com/entry/hcengdicVassociate>, 1 page.

"Right", Chambers 21st Century Dictionary, London: Chambers Harrap, 2001, Credo Reference online}[retrieved on Jul. 30, 2009], available at <http://wNw.credoreference.comlentry/chambdict/right>, 1 page.

CommVault Systems, Inc., "QiNetix Books Online Documentation," submitted on CD-ROM, released Dec. 2005.

CommVault, "Firewall Considerations—How to," <http://documentation.commvault.com/commvault/release_8_0_0/books_online_1/english_us/features/firewall/firewall_how_to.htm>, internet accessed on Feb. 27, 2009, 11 pages.

CommVault, "Firewall Considerations," <http://documentation.commvault.com/commvault/release_8_0_0/books_online_1/english_us/features/firewall/firewall.htm>, internet accessed on Feb. 27, 2009, 8 pages.

Kwok, S. H., Digital rights management for the online music business, SIGecom Exch. 3, 3 (Jun. 2002), available at <http://doi.acm.org/10.1145/844339.844347>, 8 pages.

Microsoft SQL Server Documentation, "Adding a Member to a Pre-defined Role," 1988-2000, accessed Apr. 18, 2008, 3 pages.

Microsoft SQL Server Documentation, "Adding a Member to a SQL Server Database Role," 1988-2000, accessed Apr. 18, 2008, 2 pages.

Microsoft SQL Server Documentation, "Adding a Windows User or Group," 1988-2000, accessed Apr. 18, 2008, 2 pages.

Microsoft SQL Server Documentation, "Authentication Modes," 1988-2000, accessed Apr. 18, 2008, 4 pages.

Microsoft SQL Server Documentation, "Creating User-Defined SQL Server Database Roles," 1988-2000, accessed Apr. 18, 2008, 2 pages.

Microsoft SQL Server Documentation, "Granting a Windows User or Group Access to a Database," 1988-2000, accessed Apr. 18, 2008, 2 pages.

Microsoft SQL Server Documentation, "Security Architecture," 1988-2000, accessed Apr. 18, 2008, 1 page.

Ron White, "How Computers Work", Sixth Edition, Que Corporation, Jun. 26, 2002, 7 pages.

* cited by examiner

SYSTEM AND METHOD FOR PROVIDING ENCRYPTION IN STORAGE OPERATIONS IN A STORAGE NETWORK, SUCH AS FOR USE BY APPLICATION SERVICE PROVIDERS THAT PROVIDE DATA STORAGE SERVICES

CROSS-REFERENCE TO RELATED APPLICATION(S)

This application is continuation of U.S. patent application Ser. No. 11/843,453 titled SYSTEM AND METHOD FOR PROVIDING ENCRYPTION IN PIPELINED STORAGE OPERATIONS IN A STORAGE NETWORK, filed Aug. 22, 2007, now U.S. Pat. No. 7,739,381, which is continuation of U.S. patent application Ser. No. 10/990,284, titled SYSTEM AND METHOD FOR PROVIDING ENCRYPTION IN A STORAGE NETWORK BY STORING A SECURED ENCRYPTION KEY WITH ENCRYPTED ARCHIVE DATA IN AN ARCHIVE STORAGE DEVICE, filed Nov. 15, 2004, now U.S. Pat. No. 7,277,941, which is a continuation-in-part of U.S. patent application Ser. No. 10/144,683 titled PIPELINED HIGH SPEED DATA TRANSFER MECHANISM, filed May 13, 2002, now U.S. Pat. No. 7,401,154, which was a continuation of U.S. patent application Ser. No. 09/038,440 filed Mar. 11, 1998, now U.S. Pat. No. 6,418,478; all of which are hereby incorporated by reference in their entireties.

Application Ser. No. 10/990,284 also claims the benefit of U.S. Provisional Patent Application No. 60/519,526 titled SYSTEM AND METHOD FOR PERFORMING PIPELINED STORAGE OPERATIONS IN A STORAGE NETWORK, filed Nov. 13, 2003, which application is incorporated herein by reference in its entirety.

This application is related to the following patents and pending applications, each of which is hereby incorporated herein by reference in its entirety:

- Application Ser. No. 10/990,357 titled SYSTEM AND METHOD FOR COMBINING DATA STREAMS IN PIPELINED STORAGE OPERATIONS IN A STORAGE NETWORK, filed Nov. 15, 2004, now U.S. Pat. No. 7,315,923;
- Application Ser. No. 09/495,751, titled HIGH SPEED TRANSFER MECHANISM, filed Feb. 1, 2000, now U.S. Pat. No. 7,209,972;
- Application Ser. No. 09/610,738, titled MODULAR BACKUP AND RETRIEVAL SYSTEM USED IN CONJUNCTION WITH A STORAGE AREA NETWORK, filed Jul. 6, 2000, now U.S. Pat. No. 7,035,880;
- Application Ser. No. 09/774,268, titled LOGICAL VIEW AND ACCESS TO PHYSICAL STORAGE IN MODULAR DATA AND STORAGE MANAGEMENT SYSTEM, filed Jan. 30, 2001, now U.S. Pat. No. 6,542,972;
- Application Ser. No. 10/658,095, titled DYNAMIC STORAGE DEVICE POOLING IN A COMPUTER SYSTEM, filed Sep. 9, 2003, now U.S. Pat. No. 7,130,970; and
- Application Ser. No. 60/460,234, titled SYSTEM AND METHOD FOR PERFORMING STORAGE OPERATIONS IN A COMPUTER NETWORK, filed Apr. 3, 2003.

TECHNICAL FIELD

The invention relates to data transfer mechanisms, and in particular, to a software-based, high speed data pipe for providing high speed and reliable data transfer between computers.

BACKGROUND

Data, in the process of being archived or transferred from one location to another, will pass through various phases where different operations such as compression, network transfer, storage, etc. will take place on it. There are essentially two approaches that can be taken when implementing such a transfer mechanism. One would be to split the archival process into sub-tasks, each of which would perform a specific function (e.g. Compression). This would then require copying of data between the sub-tasks, which could prove processor intensive. The other method would be to minimize copies, and have a monolithic program performing all of the archival functions. The downside to this would be loss of parallelism. A third alternative would of course be to use threads to do these tasks and use thread-signaling protocols, however, it is realized that this would not be entirely practical since threads are not fully supported on many computing platforms.

Accordingly, it is highly desirable to obtain a high-speed data transfer mechanism implemented in software and developed for the needs of high speed and reliable data transfer between computers. It is also desirable to provide a mechanism to encrypt the data being transferred.

SUMMARY

In accordance with embodiments of the invention, a method is provided for performing a storage operation in a pipeline storage system in which one or more data streams containing data to be stored are written into data chunks. The method includes generating an encryption key associated with a first archive file to be stored when encryption is requested for the storage operation, encrypting the archive data from the data stream using the encryption key to create an encrypted data chunk when a data stream containing the archive file is processed in the pipeline storage system, storing the encrypted data chunk on a storage medium, and storing the encryption key in a manner accessible during a restore operation of the encrypted data chunk.

BRIEF DESCRIPTION OF THE DRAWINGS

The invention will be better understood with reference to the following drawings, in which.

DETAILED DESCRIPTION

The present invention includes methods and systems operating in conjunction with a modular storage system to enable computers on a network to share storage devices on a physical and logical level. An exemplary modular storage system is the GALAXY™ backup and retrieval system and QiNetix™ storage management system available from CommVault Systems of New Jersey. The modular architecture underlying this system is described in the above referenced patent applications, each of which is incorporated herein.

Figure 1A:
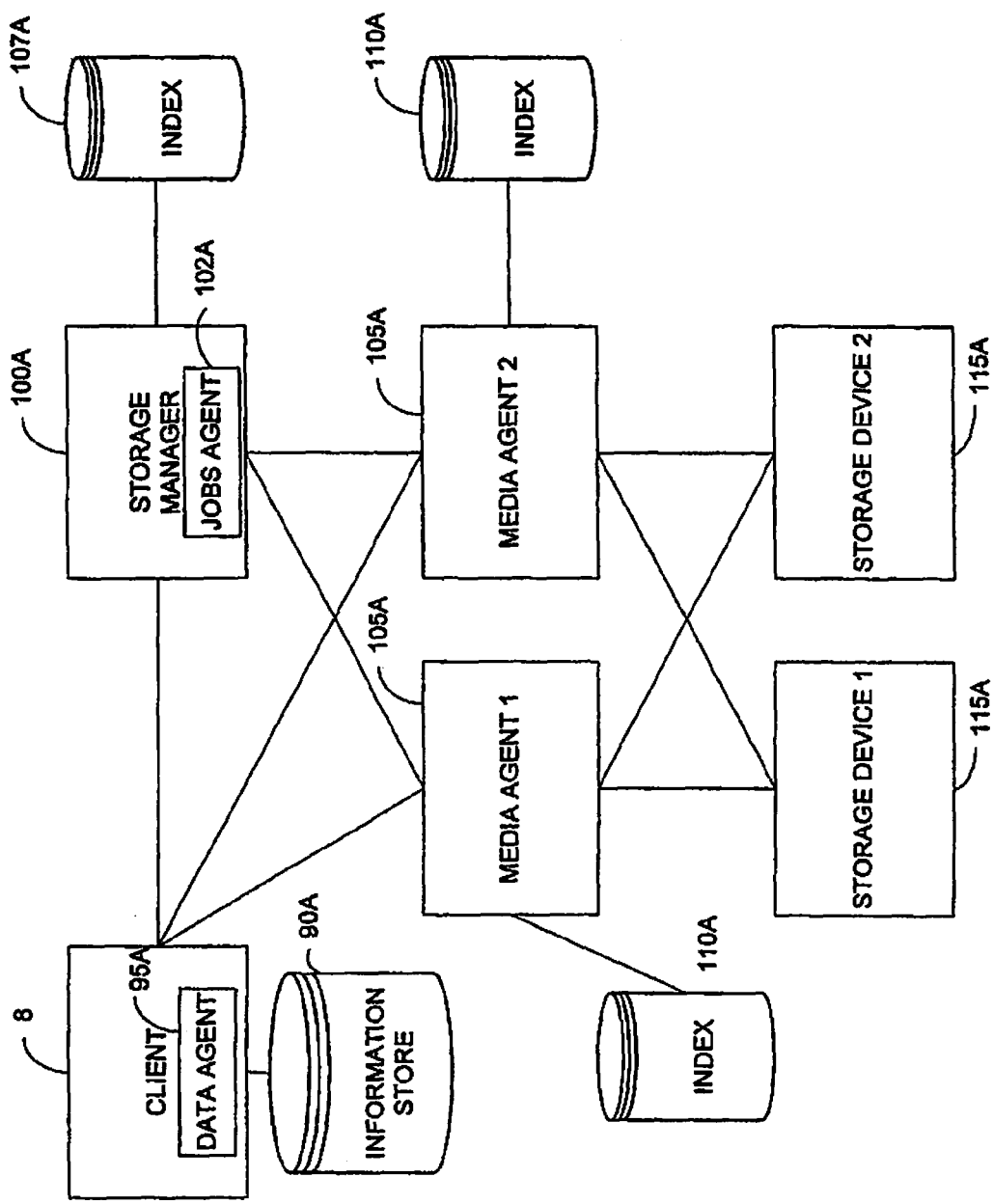
FIG. 1A is a block diagram of a network architecture for a system to perform storage operations on electronic data in a computer network according to an embodiment of the invention.

Preferred embodiments of the invention are now described with reference to the drawings. An embodiment of the system of the present invention is shown in FIG. 1. As shown, the system includes a client 8, a data agent 95A, an information store 90A, a storage manager (or storage management component) 100A, a jobs agent 102A, a storage manager index 107A, one or more media management components (or media agent) 105A, one or more media agent indexes 110A, and one or more storage devices 115A. Although FIG. 1 depicts a system having two media agents 105A, there may be one media agent 105A, or a plurality of media agents 105A providing communication between the client 8, storage manager 100A and the storage devices 115A. In addition, the system can include one or a plurality of storage devices 115A.

A client 8 can be any networked client 8 and preferably includes at least one attached information store 90A. The information store 90A may be any memory device or local data storage device known in the art, such as a hard drive, CD-ROM drive, tape drive, RAM, or other types of magnetic, optical, digital and/or analog local storage. In some embodiments of the invention, the client 8 includes at least one data agent 95A, which is a software module that is generally responsible for performing storage operations on data of a client 8 stored in information store 90A or other memory location. Storage operations include, but are not limited to, creation, storage, retrieval, migration, deletion, and tracking of primary or production volume data, secondary volume data, primary copies, secondary copies, auxiliary copies, snapshot copies, backup copies, incremental copies, differential copies, synthetic copies, HSM copies, archive copies, Information Lifecycle Management ("ILM") copies, and other types of copies and versions of electronic data. In some embodiments of the invention, the system provides at least one, and typically a plurality of data agents 95A for each client, each data agent 95A is intended to backup, migrate, and recover data associated with a different application. For example, a client 8 may have different individual data agents 95A designed to handle Microsoft Exchange data, Lotus Notes data, Microsoft Windows file system data, Microsoft Active Directory Objects data, and other types of data known in the art.

The storage manager 100A is generally a software module or application that coordinates and controls the system, for example, the storage manager 100A manages and controls storage operations performed by the system. The storage manager 100A communicates with all components of the system including client 8, data agent 95A, media agent 105A, and storage devices 115A to initiate and manage storage operations. The storage manager 100A preferably has an index 107A, further described herein, for storing data related to storage operations. In general, the storage manager 100A communicates with storage devices 115A via a media agent 105A. In some embodiments, the storage manager 100A communicates directly with the storage devices 115A.

The system includes one or more media agent 105A. The media agent 105A is generally a software module that conducts data, as directed by the storage manager 100A, between the client 8 and one or more storage devices 115A, for example, a tape library, a hard drive, a magnetic media storage device, an optical media storage device, or other storage device. The media agent 105A is communicatively coupled with and controls the storage device 115A. For example, the media agent 105A might instruct a storage device 115A to perform a storage operation, e.g., archive, migrate, or restore application specific data. The media agent 105A generally communicates with the storage device 115A via a local bus such as a SCSI adaptor.

Each media agent 105A maintains an index cache 110A which stores index data that the system generates during storage operations as further described herein. For example, storage operations for Microsoft Exchange data generate index data. Media management index data includes, for example, information regarding the location of the stored data on a particular media, information regarding the content of the information stored such as file names, sizes, creation dates, formats, application types, and other file-related criteria, information regarding one or more clients associated with the information stored, information regarding one or more storage policies, storage criteria, or storage preferences associated with the information stored, compression information, retention-related information, encryption-related information, stream-related information, and other types of information. Index data thus provides the system with an efficient mechanism for performing storage operations including locating user files for recovery operations and for managing and tracking stored data.

The system generally maintains two copies of the media management index data regarding particular stored data. A first copy is generally stored with the data copied to a storage device 115A. Thus, a tape may contain the stored data as well as index information related to the stored data. In the event of a system restore, the index information stored with the stored data can be used to rebuild a media agent index 110A or other index useful in performing storage operations. In addition, the media agent 105A that controls the storage operation also generally writes an additional copy of the index data to its index cache 110A. The data in the media agent index cache 110A is generally stored on faster media, such as magnetic media, and is thus readily available to the system for use in storage operations and other activities without having to be first retrieved from the storage device 115A.

The storage manager 100A also maintains an index cache 107A. Storage manager index data is used to indicate, track, and associate logical relationships and associations between components of the system, user preferences, management tasks, and other useful data. For example, the storage manager 100A might use its index cache 107A to track logical associations between media agent 105A and storage devices 115A. The storage manager 100A may also use its index cache 107A to track the status of storage operations to be performed, storage patterns associated with the system components such as media use, storage growth, network bandwidth, service level agreement ("SLA") compliance levels, data protection levels, storage policy information, storage criteria associated with user preferences, retention criteria, storage operation preferences, and other storage-related information.

A storage policy is generally a data structure or other information which includes a set of preferences and other storage criteria for performing a storage operation. The preferences and storage criteria may include, but are not limited to: a storage location, relationships between system components, network pathway to utilize, retention policies, data characteristics, compression or encryption requirements, preferred system components to utilize in a storage operation, and other criteria relating to a storage operation. A storage policy may be stored to a storage manager index, to archive media as metadata for use in restore operations or other storage operations, or to other locations or components of the system.

Index caches 107A and 110A typically reside on their corresponding storage component's hard disk or other fixed storage device. For example, the jobs agent 102A of a storage manager 100A may retrieve storage manager index 107A data regarding a storage policy and storage operation to be performed or scheduled for a particular client 8. The jobs agent 102A, either directly or via another system module, communicates with the data agent 95A at the client 8 regarding the storage operation. In some embodiments, the jobs agent 102A also retrieves from the index cache 107A a storage policy associated with the client 8 and uses information from the storage policy to communicate to the data agent 95A one or more media agents 105A associated with performing storage operations for that particular client 8 as well as other information regarding the storage operation to be performed such as retention criteria, encryption criteria, streaming criteria, etc. The data agent 95A then packages or otherwise manipulates the client information stored in the client information store 90A in accordance with the storage policy information and/or according to a user preference, and communicates this client data to the appropriate media agent(s) 100A for processing. The media agent(s) 105A store the data according to storage preferences associated with the storage policy including storing the generated index data with the stored data, as well as storing a copy of the generated index data in the media agent index cache 110A.

In some embodiments, components of the system may reside and execute on the same computer. In some embodiments, a client component such as a data agent 95A, a media agent 105A, or a storage manager 100A coordinates and directs local archiving, migration, and retrieval application functions as further described in application Ser. No. 09/610,738. These client components can function independently or together with other similar client components.

Data and other information is transported throughout the system via buffers and network pathways including, among others, a high-speed data transfer mechanism, such as the CommVault DataPipe™, as further described in U.S. Pat. No. 6,418,478 and application Ser. No. 09/495,751, each of which is hereby incorporated herein by reference in its entirety. Self describing tag headers are disclosed in these applications wherein data is transferred between a flexible grouping of data transport modules each supporting a separate function and leveraging buffers in a shared memory space. Thus, a data transport module receives a chunk of data and decodes how the data should be processed according to information contained in the chunk's header, and in some embodiments, the chunk's trailer. U.S. Pat. No. 6,418,478 and application Ser. No. 09/495,751 generally address "logical data" transported via TCP/IP, however, embodiments of the invention herein are also contemplated which are directed to transporting, multiplexing, encrypting, and generally processing block level data as disclosed, for example, in pending application Ser. No. 10/803,542, titled Method And System For Transferring Data In A Storage Operation, which is hereby incorporated herein by reference in its entirety.

As discussed, these applications generally disclose systems and methods of processing logical data. Thus, for example, contiguous blocks of data from a file might be written on a first volume as blocks 1, 2, 3, 4, 5, etc. The operating system of the host associated with the first volume would assist in packaging the data adding additional OS-specific information to the chunks. Thus, when transported and stored on a second volume, the blocks might be written to the second in a non-contiguous order such as blocks 2, 1, 5, 3, 4. On a restore storage operation, the blocks could (due to the OS-specific information and other information) be restored to the first volume in contiguous order, but there was no control over how the blocks were laid out or written to the second volume. Incremental block level backups of file data was therefore extremely difficult if not impossible in such a system since there was no discernable relationship between how blocks were written on the first volume and how they were written on the second volume.

Thus, in some embodiments, the system supports transport and incremental backups (and other storage operations) of block level data via a TCP/IP (and other transport protocols) over a LAN, WAN, SAN, etc. Additional data is added to the multi-tag header discussed in the applications referenced above which communicates how each block was written on the first volume. Thus, for example, a header might contain a file map of how the blocks were written on the first volume and the map could be used to write the blocks in similar order on the second volume. In other embodiments, each chunk header might contain a pointer or other similar data structure indicating the chunk's position relative to other chunks in the file. Thus, when a file block or other block changed on the first volume, the system could identify and update the corresponding copy of the block located on the second volume and effectively perform an incremental backup or other storage operation.

In the system, for example as in the CommVault Galaxy system, archives are grouped by Storage Policy. Many clients/sub clients can point to the same Storage Policy. Each Storage Policy has a Primary copy and zero or more Secondary copies. Each Copy has one or more streams related to the number of Drives in a Drive Pool.

The system uses a tape media to its maximum capacity and throughput by multiplexing data from several clients onto the same media at the same time. The system allows for a stream to be reserved more than once by different clients and have multiple data movers write to this same piece of media.

During backup or other storage operations, data from a data agent to a media agent is transferred over a "Data pipeline" as further described herein and in U.S. Pat. No. 6,418,478 and application Ser. No. 09/495,751. One or more transport processes or modules, such as the Dsbackup in the CommVault Galaxy system, form the tail end on the Media Agent for the pipeline. For example, in the Galaxy system, the Datamover process running as part of Dsbackup is responsible for writing data to the media. For data multiplexing, many such Data movers belonging to different pipelines have to write to the same piece of media. This can be achieved by splitting the Datamover pipeline process into multiple components including a data receiver, a data writer, and other modules as necessary.

The DataPipe

A DataPipe comprises a named set of tasks executing within one or more computers that cooperate with each other to transfer and process data in a pipelined manner. Within a DataPipe, a pipeline concept is used to improve performance of data transfer across multiple computers in a network. However, within a DataPipe, any stage within the pipeline may have multiple instances, thus greatly increasing the scaleability and performance of the basic pipeline concept.

The DataPipe mechanism processes data by dividing its processing into logical tasks that can be performed in parallel. It then sequences those tasks in the order in which they are to act on the data. For example, a head task may extract data from a database, a second task may encrypt it, a third may compress it, a fourth may send it out over the network, a fifth may receive it from the network, and a sixth may write it to a tape. The latter two tasks may reside on a different computer than the others, for example.

All of the tasks that comprise a single DataPipe on a given computer have access to a segment of shared memory that is divided into a number of buffers. A small set of buffer manipulation primitives is used to allocate, free, and transfer buffers between tasks.

Semaphores (or other OS specific mutual exclusion or signaling primitives) are used to coordinate access to buffers between tasks on a given computer. Special tasks, called network agents, send and receive data across network connections using standard network protocols. These agents enable a DataPipe to connect across multiple computer systems. A single DataPipe can therefore reside on more than one computer and could reside on computers of different types.

Each task may be implemented as a separate thread, process, or as a procedure depending on the capabilities of the computing system on which the DataPipe is implemented.

Figure 1B:
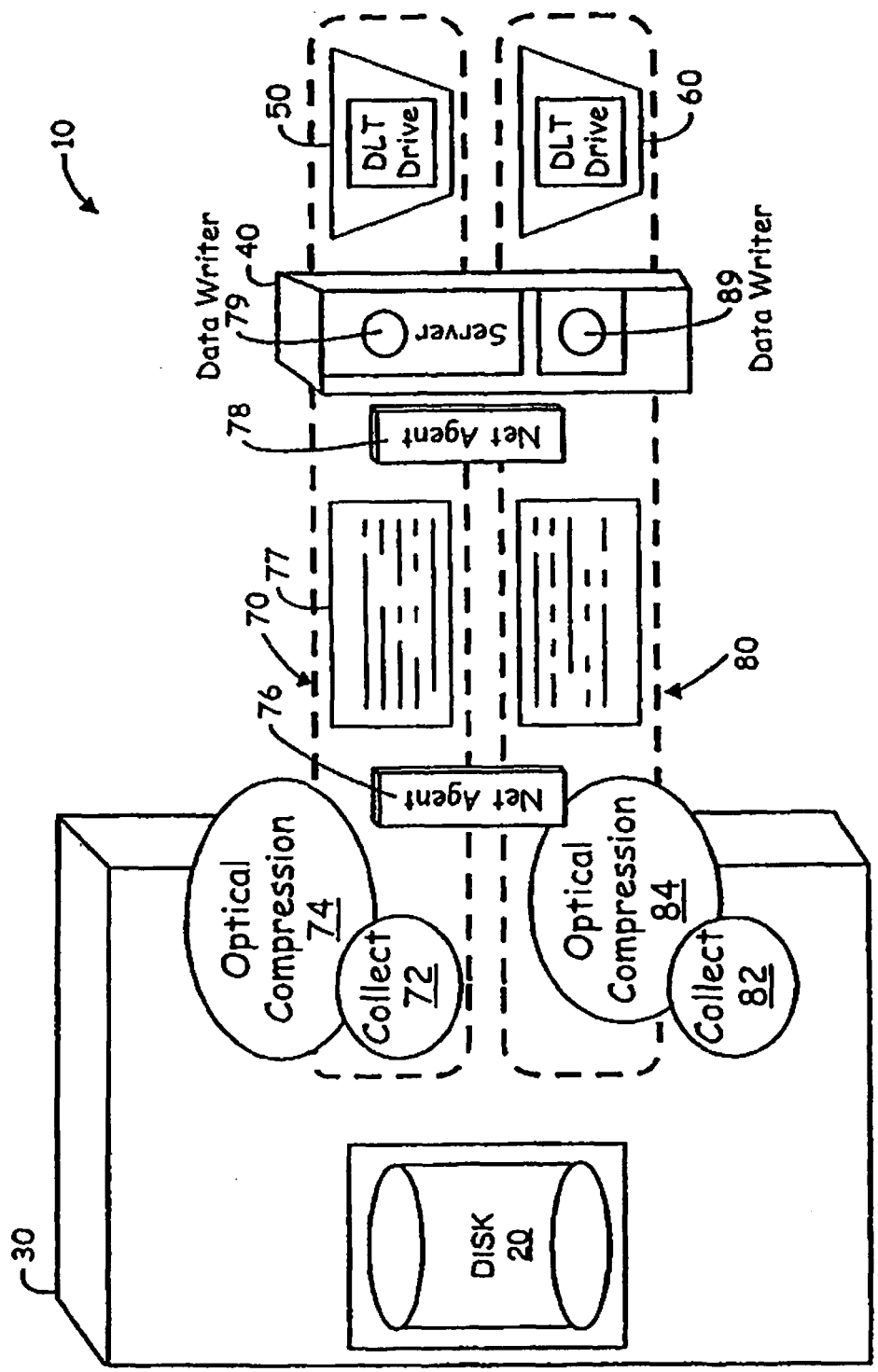
FIG. 1B is a block diagram of the data pipe architecture in accordance with one embodiment of the present invention.

As mentioned previously, each task may be implemented as a separate thread, or process, or as a procedure in a monolithic process (in cases where native platforms don't support any forms of parallel execution or multi processing). For data transfer across network, dedicated network readers and writers ensure communication across the net. FIG. 1B shows a steady state picture of how the DataPipe architecture 10 is set up according to the present invention.

Referring to FIG. 1B, there is shown a disk 20 residing on a computer machine 30 which houses information or data to be backed up or archived to server computer 40 via DLT device drivers 50 and 60 respectively. As one can ascertain, the DataPipe represents the end-to-end architecture which may be utilized during database backup from the disk drive 20 where the database resides to the tape or optical devices 50 and 60 at server 40. The DataPipe thus removes the network as the limiting factor in backup performance. As a result, the device pool defines the performance capabilities.

As shown in FIG. 1B, the DataPipe or stream 70 is created for the transfer of data for each device in the device pool to be used simultaneously, which comprises modules 72, 74, 76, and 78 and 50. Similarly, a second DataPipe 80 is shown comprised of modules 82, 84, 76, 78 and 60. Note that if additional DLT devices are used to backup data and parallel further DataPipes would be provided. Since one can ascertain the concept of the DataPipe through explanation of one path or thread by which data is transferred, further description will focus on processing through a single DataPipe or stream 70, as shown in FIG. 1B. At the head of the DataPipe is the collector component 72 which is responsible for obtaining the database information from disk 20. The data is passed down in buffers residing in dedicated shared memory through the pipeline 70, through an optional compression module 74, to the network interface modules 76. At the network interface, data is multiplexed and parallel network paths 77 obtain maximum throughput across the network. Preferably, each network path runs at a rate equal to approximately 10 base T or the number of network paths utilized for each stream as determined by the bandwidth of the network. Note that as higher performance levels are necessary, additional devices may be used simultaneously with additional network interfaces added and utilized to further increase network throughput. On the receiving side, from the database server 40, the device pull appears local to the machine and the DataPipe architecture appears as a cloud with no constraints to performance. Network interface module 78 operates to transfer the data received across the network to device driver 50 for storage at server 40. Thus, the final task of storing or archiving the data is accomplished at DLT device module 50.

Figure 2A:
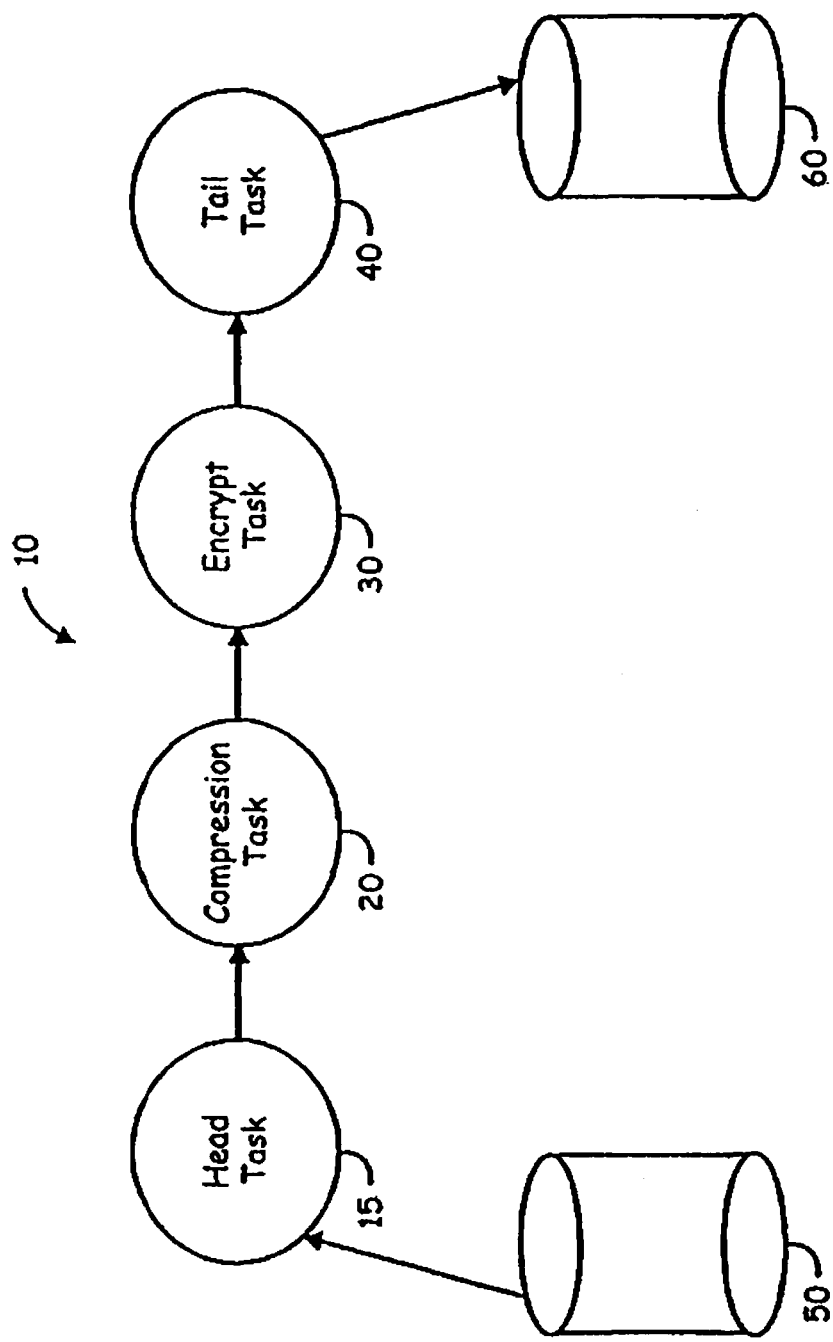
FIG. 2A is a schematic of the data pipe transfer process on a single computer according to an embodiment of the invention.

From the preceding discussion, one can ascertain that a pipeline or DataPipe 10 comprises a head task 15 that generates the data to be archived or transferred from store 50, and a tail task 40 which accomplishes the final task of storing or writing the data to store 60, including archiving or restoring on the data as shown in FIG. 2A. One or more middle modules 20, 30 may exist, which processes the data by performing actions such as compression, encryption, content analysis, etc., or by allocating or not allocating new buffers while doing the processing.

Figure 2B:
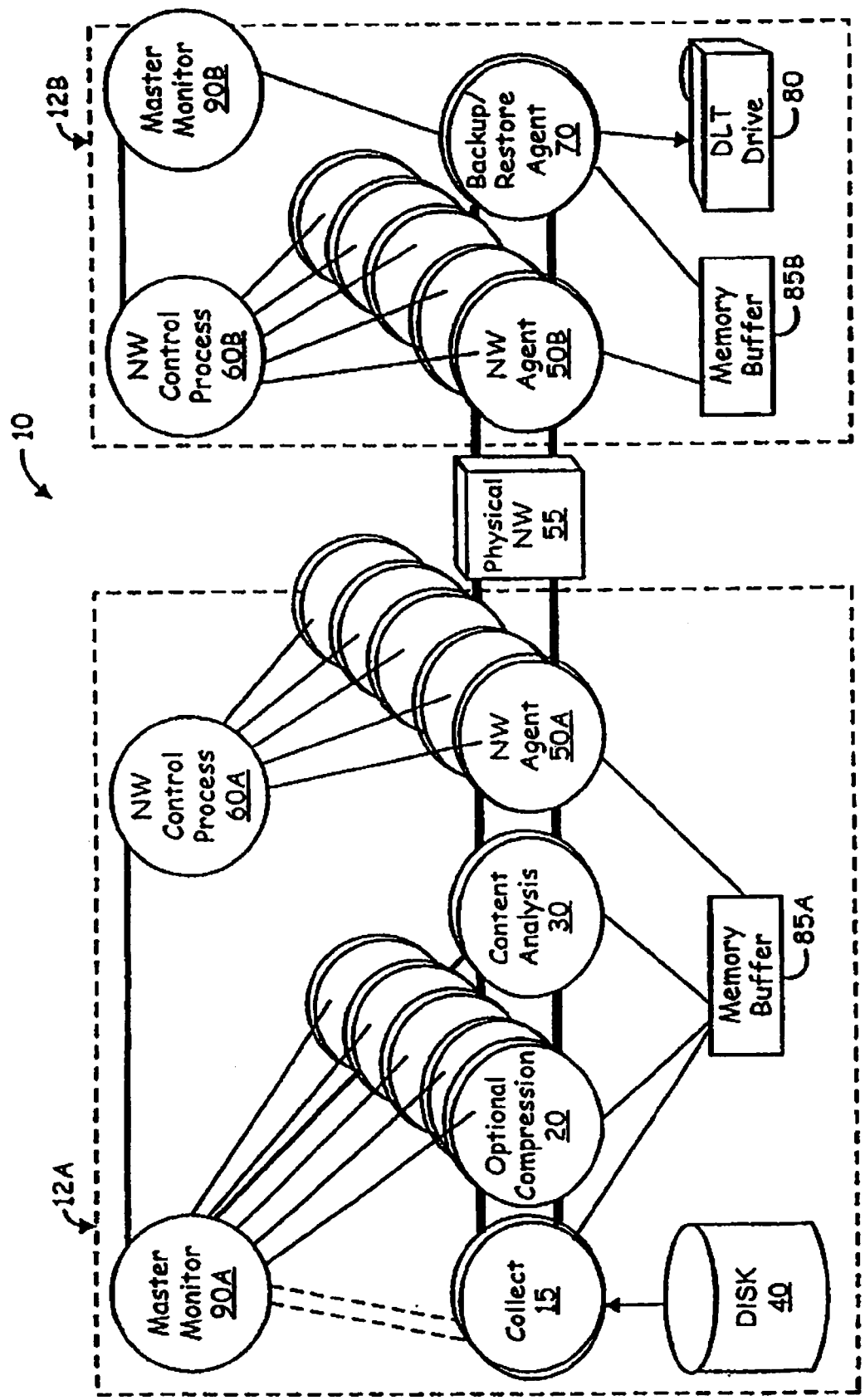
FIG. 2B is a schematic of the data pipe transfer process on multiple computers according to another embodiment of the invention.

A pipeline on a particular machine can be arranged to provide a feed to another different machine. A schematic diagram is illustrated in FIG. 2B. In this case, the DataPipe resides on more than one computer. This is done with the aid of network agents and control processors 50A, 50B, 60A and 60B. In such cases, the first machine 12A has a head 15 and other modules 20, 30, etc. comprise middle processes, but the tail of this pipeline on this machine is a cluster of dedicated network agents 50A which send data across to the remote machine 12B via standard network protocols. On the remote machine, a cluster of dedicated network reader agents 50B act as the head, and along with other modules such as middle (not shown) and tail 70, constitute the pipeline on that machine.

In addition to the transferring of data from one computer to another, a unique capability of the datapipe invention is the ability to scale to enable full utilization of the bandwidth of a network, and to fully utilize the number of peripheral devices such as tape drives, or fully utilize other hardware components such as CPUs. The scaleability of a DataPipe is achieved by using multiple instances of each task in the pipeline.

For example, multiple head tasks operating in parallel may gather data from a database and deposit it into buffers. Those buffers may then be processed by several parallel tasks that perform a function such as encryption. The encryption tasks in turn may feed several parallel tasks to perform compression, and several parallel tasks may perform network send operations to fully exploit network bandwidth. On the target computer, several network reader tasks may receive data, which is written to multiple tape units by several tasks. All of these tasks on both computers are part of the same DataPipe and collectively perform the job of moving data from the database to tape units. They do this job extremely efficiently by fully utilizing all available bandwidth and hardware allocated to the DataPipe while also minimizing CPU cycles by avoiding unnecessary copying of the data as it moves from one stage of the DataPipe to the next.

FIG. 2B shows the multiple computer case where a single head task (collect process) gathers data from the disk 40 and deposits it into buffers. The buffers are then processed by several parallel instantiations of compression process 20 which upon completion of processing of each buffer for each instantiation sends the process buffer to process 30 which performs content analysis, and sends the processed buffer data to several network agent tasks 50A or instantiations, which perform the network operations to send the data over the physical network 55 where it is received and processed by corresponding network agents 50B on the remote computer 12B and sent to tail backup/restore process 70 for storage or writing to DLT drive 80.

In general, there could be N stages in a given DataPipe pipeline. At each stage of the pipeline, there could be p instances of a given module task. These N stages could all be on the local machine or could be split across two different machines in which case there are network writers and network readers (i.e. pseudo tail and head network agents) which work together to ensure continuity in the pipeline.

Referring to FIG. 2B, each DataPipe has a dedicated memory segment 85 on each machine on which the DataPipe resides. For example, a DataPipe that sends data from machine 12A to machine 12B has two dedicated memory segments, one on machine A and one on machine B. Tasks that are part of this DataPipe may allocate and free buffers within these memory segments. Of course, tasks operating on machine 12A may only allocate or free buffers within the memory segment 85 on machine A and likewise for tasks on machine B. Thus, any of these modules may allocate or free segments of a single large shared memory on each machine dedicated for the use of this particular pipeline.

Buffer Manipulation Primitives

Figure 2C:
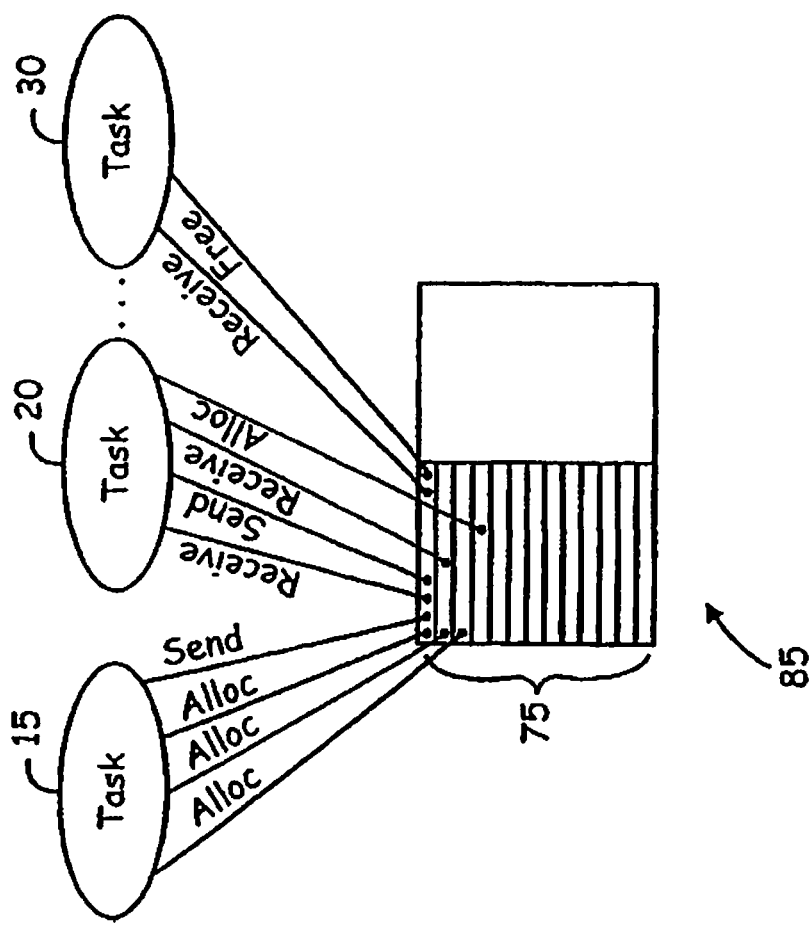
FIG. 2C is a schematic of the data pipe transfer buffer allocation process from a buffer pool stored in the shared memory according to an embodiment of the invention.

Referring now to FIG. 2C, each task or process (15) that wishes to allocate a buffer does it from a buffer pool 75 stored in the shared memory segment 85 owned by the DataPipe using AllocBuf( ) Each task that wishes to process incoming data from the previous task executes a receive call using ReceiveBuf( ) Each task that wishes to relinquish control of a particular buffer so that the next task can operate on it, performs a SendBuf( ) on that buffer to send it to the next task. Each task that wishes to destroy a buffer and return it into the buffer pool, does so by executing a FreeBuf( ) on that buffer.

Master_Monitor is connected to a predefined port, to enable it to communicate with its peers on other computer systems. Master_Monitor monitors the status of all DataPipes under its control at all times and is able to provide status of the DataPipe to the application software that uses the DataPipe.

Figure 2D:
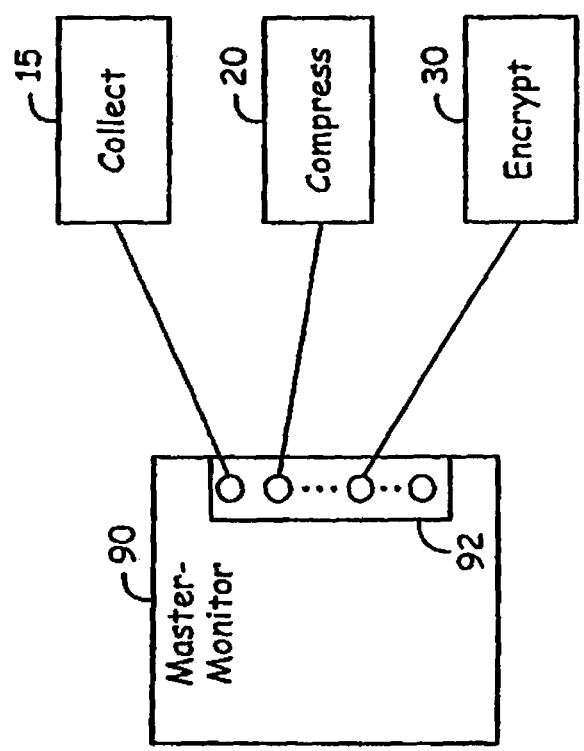
FIG. 2D is a schematic illustrating the controlling relationship of the master monitor process to the various attached processes according to an embodiment of the invention.

To accomplish these above tasks, a master manager program called Master_Monitor executes in the preferred embodiment as a daemon on all process machines, listening on a well-known port, to serve requirements of pipeline operations. Master_Monitor functions to monitor status of all pipelines under its control at all times and reports status of the pipeline to all its sub-modules. As shown in FIGS. 2B and 2D, Master_Monitor includes control messaging sockets 92 open to all modules through which it can control or change status of execution of each module. Master_Monitor 90 further includes functions which monitor status and listings of all centrally shared resources (among various modules of the same pipeline) such as shared memory or semaphores or any similar resource. Master_Monitor unless otherwise requested will initiate all modules of the pipeline either by fork( ) or thread_create( ) or a similar OS specific thread of control initiation mechanism. Master_Monitor will permit initiation of a pipeline with proper authentication. This initiator process can identify itself as either a head process or a tail process, which will later attach itself to the pipeline. (Exception is made in the case of a networking module, for this facility. A network process will not be allowed to attach itself as a the head or tail of any pipeline.)

DataPipe Initiation

Figure 3A:
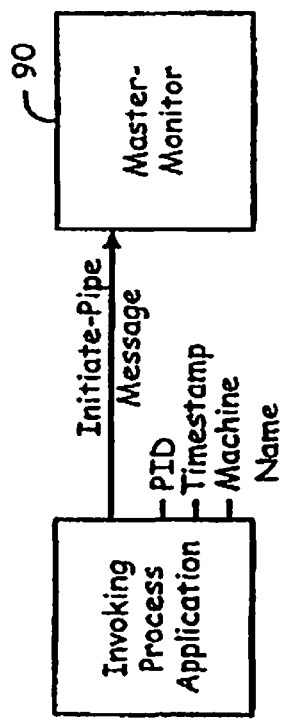
FIGS. 3A-3C illustrate various messages transferred between application processes and the master monitor process according to an embodiment of the invention.

Referring now to FIG. 3A in conjunction with FIGS. 1 and 2A-D, a DataPipe is created by calling Master_Monitor and passing it an Initiate_Pipe message. In this message, parameters such as the DataPipe name, DataPipe component module names, the number of parallel instances for each component, properties of each component (e.g. whether they allocate buffers or not), local and remote machines involved in the DataPipe, direction of flow, nature of the invocation program etc. are passed to Master_Monitor. Note that the term "module" refers to a program that is executed as a task as part of an instance of a DataPipe. Each module may have more than one instance (e.g. execute as more than one task) within a DataPipe.

Figure 3B:
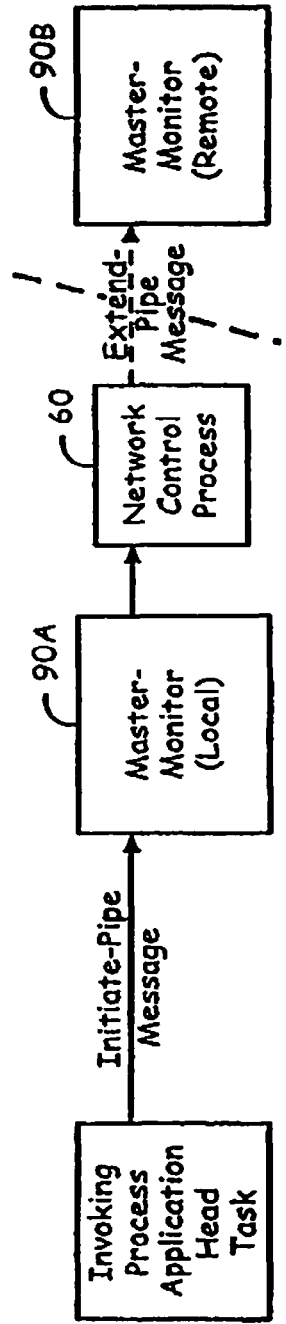

Referring now to FIG. 3B, depending upon the nature of the invocation program, it may be required that the process invoking the DataPipe needs to identify itself to the local Master_Monitor 90A and attach itself to the DataPipe as a head or tail task. In order to operate over a network on two computers, the Master_Monitor 90 initiates a Network Controller Process 60 on the first machine which contacts Master_Monitor 90B on the second machine where this DataPipe is to be completed using an Extend Pipe message. All information required for establishing the second side of the DataPipe is passed along with this call so that the DataPipe is completely established across both machines.

Identification

Figure 3C:
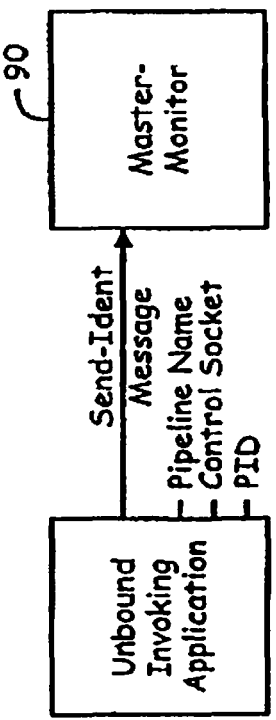

The process responsible for initiation of the pipeline constructs a name for the pipeline using its own process Id, a time stamp, and the name of the machine where the initiator process is running. This pipeline name is passed along with both the Initiate-Pipe as well as the EXTEND_Pipe message so that the pipeline is identified with the same name on all computers on which it is operating (i.e. both the remote as well as the local machine). All shared memory segments and semaphores (reference numeral 85 of FIG. 2C) attached to a particular pipeline are name referenced with this pipeline name and definite offsets. Hence the process of identification of a specific semaphore or shared memory associated with this pipeline is easy and accessible for all processes, and bound modules (i.e., modules for which control is initiated by the Master_Monitor). Each unbound module (i.e., a module not initiated via Master_Monitor, which attaches itself after the pipeline is initiated) must identify itself to its local Master_Monitor via a SEND_IDENT message shown in FIG. 3C. This message contains the name of the pipeline the unbound module wants to attach itself to, a control socket, and a process/thread id, which Master_Monitor uses to monitor status of this particular module.

Data Transfer Implementation

Allocation: Receive: Send: Free

Figure 4A:
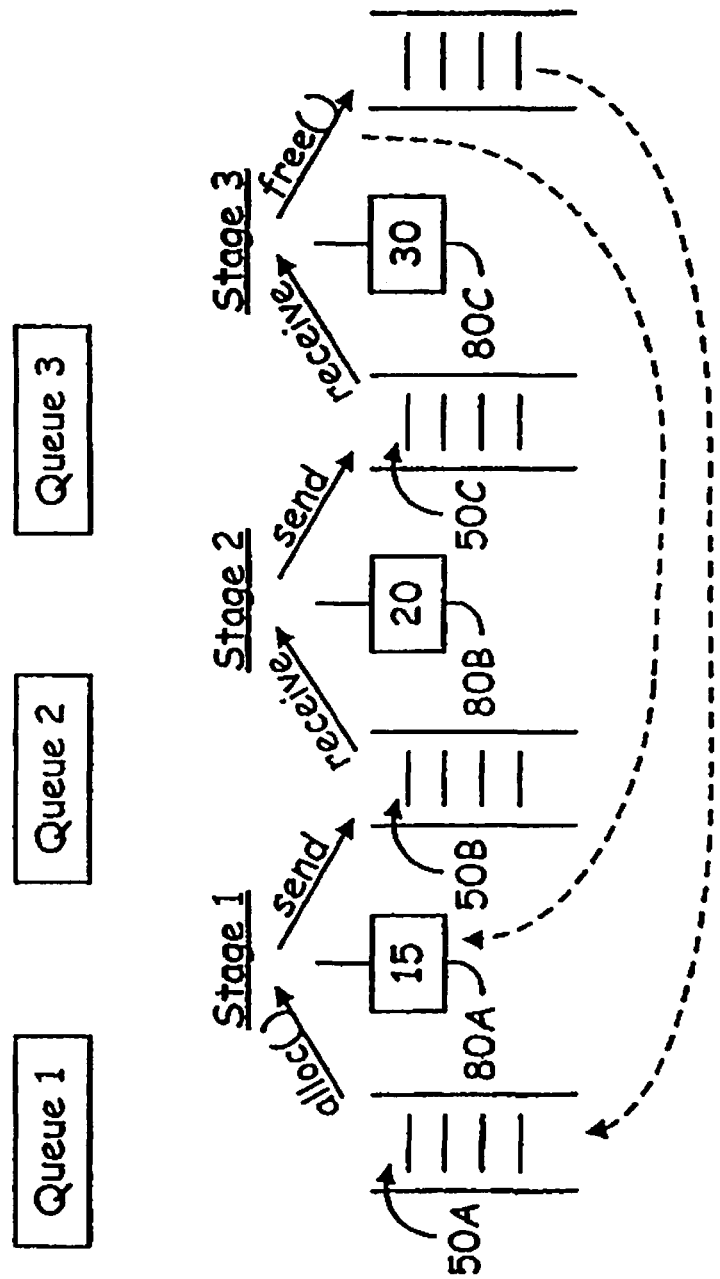
FIG. 4 is a schematic of the module attachment process to shared memory space in accordance with the present invention.
Figure 4B:
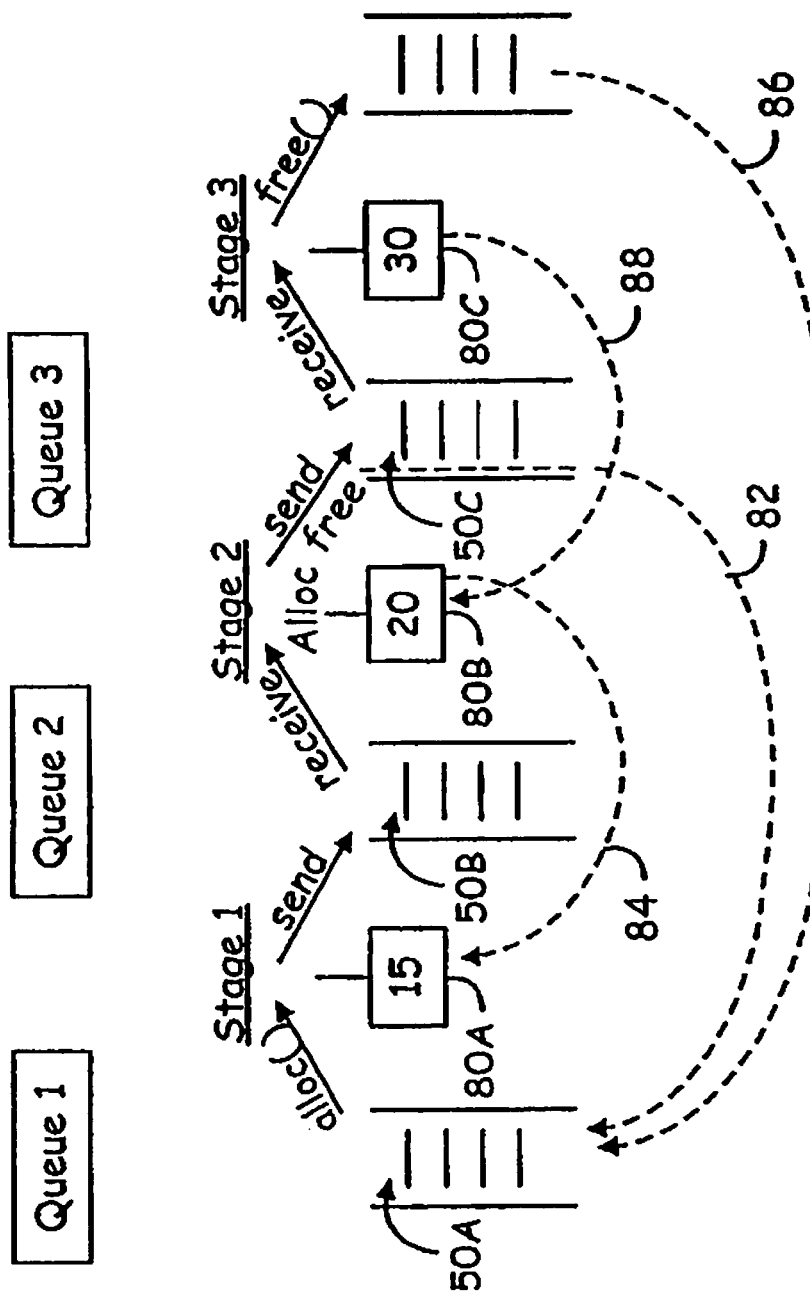

Directing attention to FIG. 2C and FIG. 4, buffers are allocated using the call AllocBuf( ) from a common pool of buffers specified for the particular pipeline. The pool consists of a single large shared memory space 75 with Max Buffers number of equally sized buffers and an 'rcq' structure. The 'rcq' structure illustrated in FIG. 4, contains input and output queues for each stage of the pipeline on that particular machine. Access to shared memory is controlled using a reader writer semaphore.

As shown in FIG. 4, the input queue of an ith stage module is the output queue of the (I−1)th stage module. The input queue of the first module is the output queue of the last module of the pipeline on that machine. Allocation is always performed done from the input queue of the first module or process. However, to ensure that no allocation task can unfairly consume buffers, allocation of buffers to each module is limited to a threshold value of Max_Buffers/NA, where NA is the number of allocators in the pipeline on this particular machine. These parameters are stored under control of the Master_Monitor program, which determines whether any process has exceeded its allocation. This means there could be K unfreed buffers in the system allocated by a single instance of a module H, where K is Max_Buffers/NA. Further allocation by module H will be possible when a buffer allocated by H gets freed.

All FreeBuf( ) calls free their buffers into the input queue of first module. By the same rule, first stage modules are never permitted to do a ReceiveBuf( ) but are permitted to do AllocBuf( ) On the other hand, tail processes are permitted to perform only FreeBuf( ) and never permitted to do a SendBuf( ) All other modules can Receive, Allocate, Send, and Free buffers. First stage modules always perform SendBuf( ) after they execute each AllocBuf( )

Each queue 95 is associated with a semaphore to guarantee orderly access to shared memory and which gets triggered upon actions such as AllocBuf( ) ReceiveBuf( ) SendBuf( ) and FreeBuf( ) Dedicated network agents thus map themselves across any network interface on the system, as long as data propagation is ensured. The number of network agents per pipeline is a configurable parameter, which helps this mechanism exploit maximum data transfer bandwidth available on the network over which it is operating. A single dedicated parent network thread/process monitors performance and status of all network agents on that particular machine for a particular pipeline.

Referring again to FIG. 4, upon allocation of a buffer by AllocBuf( ) or receipt of a buffer by ReceiveBuf( ) the buffer is taken off from the input queue and assigned to the module which performed the call. Upon completion of processing on this buffer, it is passed forward by mean of SendBuf( ) or FreeBuf( ) and the buffer is forwarded to its destination queue or it is freed for reuse by FreeBuf( ) AllocBuf( ) decrements the input queue semaphore of the first module and also decrements the semaphore which is the allocator Index for this particular module. Each FreeBuf( ) increments the allocator Index of the module who allocated this particular buffer. Information relevant to this operation is always available along with the buffer with which we are performing the free operation.

Attachments

As the identification process is completed, all modules attach themselves to a specific shared memory space segment that is shared among modules on that machine for this particular pipeline. This shared memory segment has many data buffers, input queues for all stages on the pipeline, and their initial values. Each module identifies its own input queues and output queues depending on the stage that module is supposed to run at, and initial queue (first stage) is populated with number of data segments for sharing on this particular pipeline. Also all modules attach themselves to an allocator semaphore array, which controls the number of buffers allocated by a specific module that can be active in the pipeline.

Data Integrity

Figures 5A, 5B:
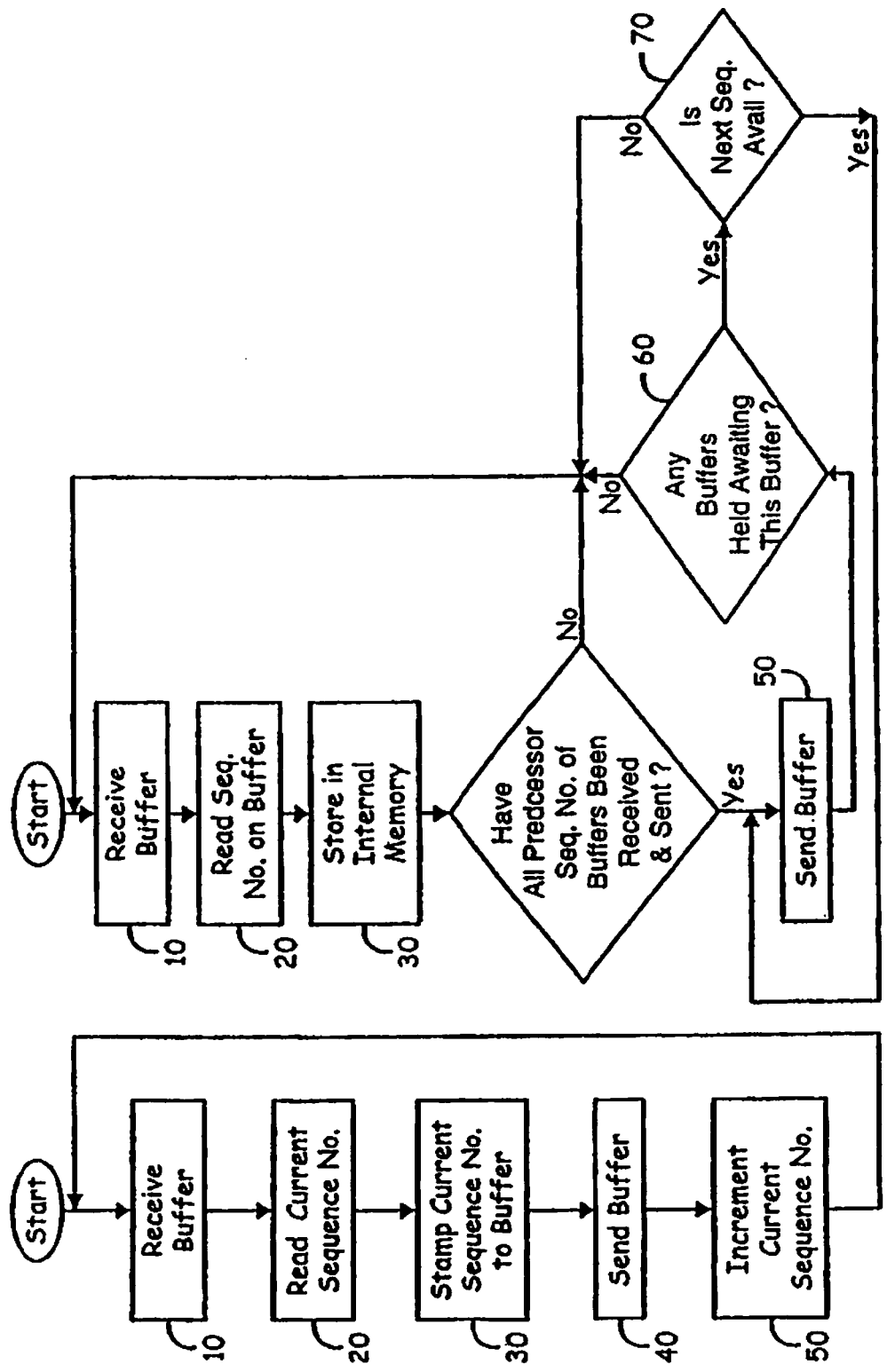
FIGS. 5A-5B depict flow diagrams of the operation of the sequencer and resequencer processes according to the present invention.

Integrity of the data passed along and the sequencing of data are maintained in part by a pair of special purpose modules termed sequencer and resequencer processes. FIGS. 5A and 5B provide diagrams of the operation of the sequencer and resequencer processes respectively. Referring to FIG. 5A, the sequencer process receives each buffer (module 10), reads the current sequence number stored in memory (module 20), and then stamps the buffer, and then stamps the buffer with the current sequence number (module 30) and sends the stamped buffer to the next stage for processing (module 40). The current sequence number is then incremented (module 50) and the process is repeated for each buffer received by the sequencer. The resequencer is operative to receive all input buffers and store them internally and wait for the required predecessor buffers to show up at the input queue before forwarding them all in the next sequence to the next stage of processing.

Referring now to FIG. 5B, the resequencer receives a buffer (module 10) of data and determines the sequence number associated with that buffer (module 20). The buffer is then stored in internal memory (module 30) and a determination is made as to whether all preceding sequence numbers associated with buffers have been received and stored (module 40). Until then, the re-sequencer waits for the required predecessor buffers to show up at the input queue. When all predecessor buffers are available, these buffers are sent (module 50) to the next processor stage. The sequencer/re-sequencer process pairs thus ensure proper data sequencing across a set of network reader/writer modules having multiple instantiations of a particular process. Note however, that when there is only one instance of a module present at any particular stage, by virtue of the queuing mechanism available with all input queues, data sequence in the right order is insured.

Hence, in the preferred embodiment, all data pipe transfers employing multi-instance stages via the sequencer/resequencer processes ensure that the input sequence of sequence numbers are not violated for each instance of the module. Further, the restriction that all modules of a specific multi-instance stage should be of the same type eliminates the chances for preferential behavior.

Fairness

The concept of fairness means that each task will be assured of getting the input buffers it needs to operate on without waiting longer than necessary. Fairness among the modules in a given DataPipe where no stage of the pipeline has more than one instance is automatic. As the tail task frees a buffer it enters the free buffer pool where it may enable the head task to allocate it and begin processing. All tasks in the DataPipe operate a maximum speed overlapping the processing done by other tasks in the preceding or following stage of the pipeline.

If a DataPipe has stages consisting of parallel instances of a task, fairness among those tasks is assured by using an allocator semaphore which counts from Max_Buffers/NA (where NA is the number of allocators for this DataPipe on this particular machine) downward to zero. All FreeBuf( ) increment this semaphore back, however, there could be only Max_Buffers/NA buffers allocated by any allocator module in this DataPipe. This ensures that all allocators get a fair share of the available total number of input buffers. If a particular process attempts to allocate more buffers than it is allowed, the master_monitor process prevents such allocation, causing the process to either terminate or wait until a buffer currently allocated to the process becomes freed thereby incrementing the semaphore back up to allow the process to allocate another buffer.

Control Messages

All instances of all modules have a control socket to Master_Monitor over which control messages are exchanged. All network readers/writers have an analogous control socket to their parent network agent. The parent network agent itself has a control socket to Master_Monitor. Each module periodically checks its control socket for any messages from Master_Monitor. Critical information such as a STOP_PIPE message is passed to Master_Monitor via this mechanism.

Status Monitoring

Each module initiated by Master_Monitor on a given machine is monitored by either a parent network process (in the case of network reader or writer), or by Master_Monitor itself, for states of execution. In case any module is reported as having terminated abnormally, Master_Monitor identifies this exception, and signals all the modules on that particular pipeline to stop. This is done by means of control messages through control sockets as described previously. Upon safely stopping all modules pertaining to this particular pipeline, it signals the remote machine's Master_Monitor to stop the remote side of this particular pipeline and entire pipeline is shut down safely by means of control message signaling.

Implementation

In a preferred embodiment, DataPipe is implemented on Sun Solaris or HP-UX operating systems and incorporated into Release 2.7 of CommVault System's Vault98 storage management product.

Figure 6:
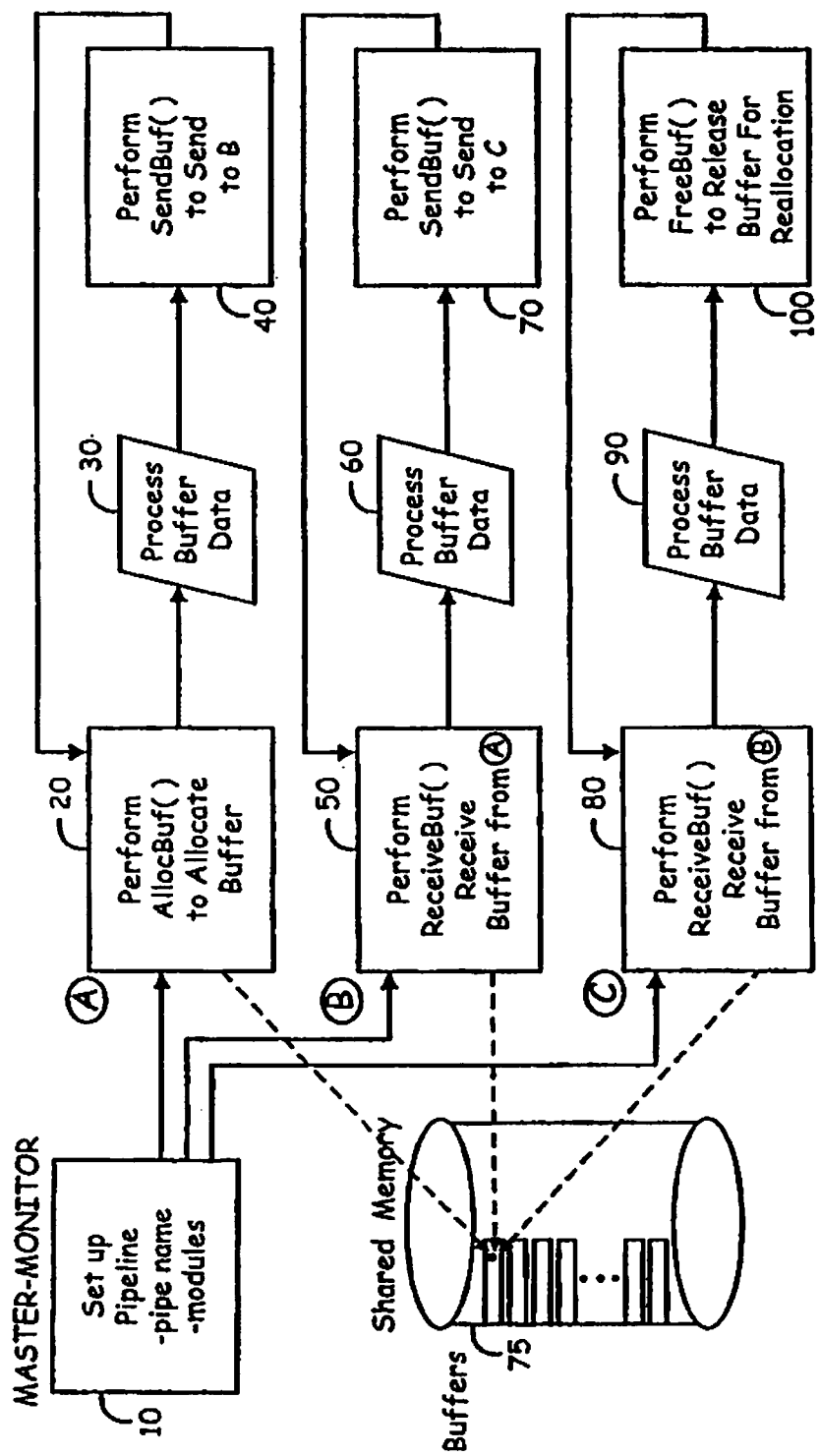
FIG. 6 depicts an exemplary data transfer flow among various processing stages within the pipeline according to the present invention.

FIG. 6 is an illustrative example of the sequence of primitive commands used to set up a DataPipe. The DataPipe is then used to process data in three modules named A, B and C.

To set up the DataPipe the Master_Monitor for this is called giving it the name of the DataPipe and the names of the modules that will use the pipe (module 10).

Master_Monitor (Initiate_Pipe(Sample_pipe,A,B,C)).

Within the logic of module A, Alloc_Buf( ) function is then called to obtain a buffer (20). The logic of module A may perform any actions it wants to fill the buffer with useful data. When it has completed its processing of the buffer (30), it calls SendBuf( ) to send the buffer to module B for processing (40). Module A then repeats its function by again calling Alloc_Buf( ) to obtain the next buffer.

The logic of module B calls ReceiveBuf( ) to obtain a buffer of data from module A (50). It then operates on the buffer by performing processing as required (60). When it is finished with the buffer it calls SendBuf( ) to send that buffer to module C (70).

Module B then repeats if function by again calling ReceiveBuf( ) to obtain the next buffer from module A.

Module C obtains a buffer of data from module B by calling ReceiveBuf( ) When it has completed its processing of the data in that buffer (90), it calls FreeBuf( ) to release the buffer (100). Like the other two modules, it loops back to receive the next buffer form module B.

The primitives used to allocate, free, send, and receive buffers are synchronized by the use of semaphores. This ensures coordination between the modules so that the receiving module does not start processing data before the sending module has finished with it. If no buffer is available, the AllocBuf or ReceiveBuf primitives will wait until one is available. All three modules operate in parallel as separate tasks. The order of processing from A to B to C is established in the initial call to Master_Monitor that established the DataPipe.

Figure 7:
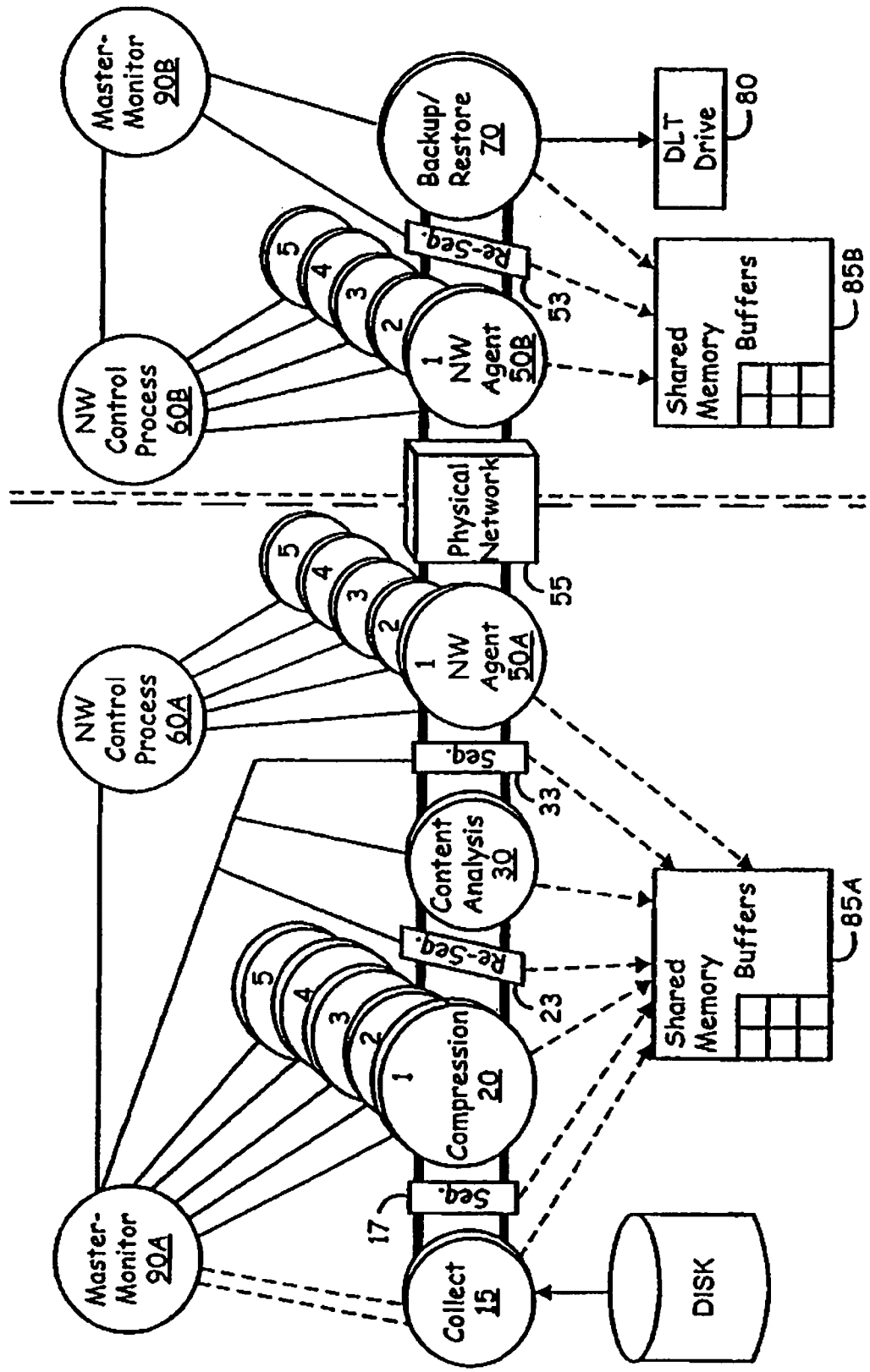
FIG. 7 illustrates a data pipe transfer process on multiple computers having processes with multiple instantiations according to an embodiment of the present invention.

Referring now to FIG. 7, there is shown another embodiment of the DataPipe apparatus as it is used within Vault98 to provide a high speed path between a "client" system containing a large database that is being backed up to the "CommServ" server and stored as archive files on a DLT drive. Everything on the collect side, of the physical network are part of the client software configuration, whereas everything on the DLT drive side of the physical network are part of the server software configuration. The "collect" activities on the client prepare data to be sent over the DataPipe to the CommServ.

FIG. 7, which is similar to FIG. 2B, depicts a two computer configuration where a header task 15, identified as a collect process, is initiated via Master_Monitor daemon 90A on the first computer. Collector 15 retrieves data from the disk and allocates the buffer from the shared memory 85A for processing the data to be transferred. Collector 15 then sends the data to the compression process 20 which functions to compress the data as it moves over the pipe. As shown in FIG. 7, multiple instantiations of compression module 20 are provided at this stage for effectively processing the data as it flows across the system. Accordingly, sequencer 17 initiated by Master_Monitor 90A is coupled directly between collect module 15 and compressor module 20 to stamp each of the buffers with the sequence number as described previously. Re-sequencer module 23 is coupled to the output queue of the compression module 20 instantiations to properly reorder and re-sequence the buffers sent from the instantiations of module 20 to content analysis module 30. Content analysis module 30 then receives the buffers from re-sequencer 23, processes the data, and sends the buffers to sequencer 33, which again stamps the buffers and sends them to multiple instantiations of network agents 50A for processing across the physical network via standard network protocol such as TCP IP, FTP, ICMP etc. Network agents 50B are instantiated by network control processor 60B in communication with remote Master_Monitor 90B to provide multiple network agent instantiations, where each agent on the remote side uniquely corresponds and communicates with corresponding agent on the local side. In the preferred embodiment, each network agent 50A on the local side performs a copy of the data in the buffer for transfer over the physical network to its corresponding network agent 50B on the remote side and then performs a free buffer function call to free the buffers associated with shared memory 85A for reallocation. On the remote side, the network agent 50B receives the data transferred over the network and acts as a header on the remote side to allocate each of the buffers in shared memory 85B. These buffers are then sent to re-sequencer 53 which stores buffers received in internal memory until each of the predecessor buffers are received, and then forwards them to the backup restore process 70 via the send buff function. The backup restore process then functions to write the contents of each of the buffers received to DLT drive 80, and upon completion, frees each of those buffers to permit further reallocation in the buffer pool and shared memory 85B. As one can see, this pipeline could be set up over any high speed network, such as ATM, FDDI, etc. The pipeline is capable of utilizing entire practical bandwidth available on the physical network by means of multiple network agents. In cases where real high speed networks are available (networks which have transfer rates higher than DLT drives), multiple pipelines are set up, to utilize resources available to the full extent.

Encryption

As discussed above, the system also supports encrypted pipelined data transfer by allowing for encryption to be one of the processes or tasks performed in the datapipe.

Data protection in storage management systems is a tradeoff between user's convenience and security, speed of operation and capabilities of the encryption algorithm, length of the encryption keys, government restrictions, and other elements known in the art. There are many encryption algorithms available that vary by strength, speed and other parameters. Most encryption algorithms, however, offer various ways to manage the encryption keys. For example, some implementations include hardware USB devices that can store user's private keys. Whenever that user needs an access to some encrypted material, the hardware unit is inserted into the USB slot, and the key is retrieved from the unit. Some units have built-in encrypting capabilities, providing additional security: the key no longer has to travel over the USB bus. All crypto operations are conducted within the unit itself.

More conventional implementations involve storing secret keys in so-called key rings (technically just binary files with some specific format) protected with a user's pass-phrase. The user's pass-phrase is stored nowhere but in the user's head, so the secret keys can be considered to be almost secure. "Almost" because the security of the keys now depend on a human-selected word or phrase, and human languages are known to be quite redundant (1.3 bits for a letter in average English text), plus some sort of dictionary attack is possible. Thus, users and system administrators must chose a system of key management that best suits their particular needs.

Users and system administrators also confront the problem of key distribution. If there is more than one computer involved, there will be need for transferring keys from one machine to the other. One can say that a "secure" link is needed. But the security of such "secure" link has to be guaranteed by some other key, which should have been distributed first, but for distribution of which another secure session would be needed, etc. etc.

When transferring encrypted data, users generally must confront key management issues and often will want to have precise control over where sensitive information is stored and how this information is stored. In some embodiments, users only want some minimum scrambling, or want only the security of the pipeline connection for secure over-the-network data transfer, and prefer not to enter pass-phrases or use other methods every time they wish to encrypt or decrypt data. Such users will probably be satisfied storing the keys in some scrambled form on the CommServe, media agents, storage media, or other elements of the system. Thus, in some embodiments, for example, in the CommVault Galaxy system, the key management problem divides in two: key management on the CommServe or storage manager and key management on the backup media.

To be able to restore encrypted data back, the data encryption keys must generally be stored somewhere. While it is possible to store keys on the media itself where encrypted data is being stored, keys are generally stored in the storage manager or CommServe database/index cache. The CommServe can be configured to trust sensitive data to it unconditionally, or users may agree to store such data on the CommServe, provided that some additional protection is involved. For example, additional protection could be a pass-phrase that only customer knows.

Thus, as far as key storage on the CommServe is concerned, we generally have two cases: strong (where keys are encrypted with a pass-phrase) and weak (where keys are simply scrambled in the index cache)

With strong encryption key management (also referred to herein as "CS_KM_STRONG"), the data encryption keys are stored on the CommServe protected by some sort of a pass-phrase. For example, the pass-phrase may exist only in the customers head. Such an encryption scheme offers many benefits. For example, even though the data encryption keys are kept on the CommServe and can be accessed by the storage management software, such as CommVault's Galaxy software, when needed, the storage manager still lacks one important piece of information without which the encryption keys cannot be reconstructed—the user's pass-phrase. Without this pass-phrase the keys are unusable, and the data is unrecoverable.

In some embodiments, the system prompts the user to enter the pass-phrase every time when a restore is attempted. In other embodiments, the system does not prompt users to enter pass-phrases during the backup (so that Galaxy could get the data encryption key to perform the backup encryption).

Asymmetric public-key cryptography is used to facilitate this latter method. Asymmetric algorithms use two keys instead of one. The first key (called public) is not protected, and is used to encrypt the data. The second key (called private) is guarded by all means, and can be used to decrypt the data. Thus, in some embodiments, the system encrypts backup data with the public key (which can be stored unprotected in the CS database), and decrypt backup data with the private key (which will be protected by user's pass-phrase). In some embodiments as further described herein, poor performance of asymmetric crypto algorithms may avoided by using symmetric cipher to perform data encryption, and storing the symmetric data encryption key encrypted with the asymmetric public key.

With weak encryption key management (also referred to herein as "CS_KM_WEAK"), keys are merely scrambled in the storage manager index cache and do not generally require a pass-phrase. For example, in some embodiments, users may consider their CommServes to be secure or at minimal risk and thus not require a strong encryption key management scheme as discussed above. Also, users may dislike the additional inconvenience of having a pass-phrase to remember and enter during restores.

Thus, the data encryption key is stored in a scrambled form in the database. Something is generally referred to as "scrambled" if it's made unintelligible by some sort of built-in algorithm, which is not controlled by any key or pass-phrase that would exist separately from this algorithm. Clearly, scrambling is potentially less secure than strong encryption key management, because by isolating the scrambling/descrambling code in the Galaxy binaries, any scrambled information can be restored to its original form. The advantage of scrambling (weak) over pass-phrase (strong) encryption is that both backups and restores will not require user to provide any extra information (such as the pass-phrase).

In some embodiments, for example, in an application service provider ("ASP") setting or other similar setting, trust level varies between components of the system. For example, an ASP might maintain Media Agents and CommServes in an ASP-controlled data center, but the system's Data Agents might belong to the ASP's customers. Thus, the Data Agents may or may not be configured to fully trust the ASP to handle their data. In this situation the data being backed up belongs to the customers, and the customers completely trust Data Agents (because they're in customer's physical control), but Media Agents and CommServe databases are handled by ASP, so customers don't really trust either of them.

One possible solution is to protect everything with a pass-phrase, which the ASP's customers can set without the ASP's knowledge. There is no real problem here except for the customer now having to specify pass-phrase each time when they perform restore operation. In some embodiments, however, this minor inconvenience can be worked around by means of pass-phrase export files. These files are kept on the Data Agent in a dedicated directory (e.g. /opt/galaxy/PF or some other similar directory) and contain Data Agent's pass-phrase in some scrambled form. Thus, each time a restore starts, the restore process looks for the pass-phrase export files on the destination machine, and if such file is found, use the enclosed pass-phrase to unlock the encryption keys. Thus, the customer can restore his data to his machines w/o having to provide a pass-phrase, but for anyone else (including the ASP), data restoration is impossible without the pass-phrase.

In some embodiments, unattended Synthetic Full backups present a different problem. Synthetic Full backups combine a full backup with several incrementals to produce a new full backup. This combining involves running backup and restore pipelines. Since restoring encrypted data generally requires a pass-phrase, unattended SynthFull backups are often impossible when CommServe security is CS_KM_STRONG.

One possible work around this problem is to have a copy of asymmetric public key stored scrambled (rather than encrypted with the user pass-phrase) specially for running SynthFull backup processes. The hack is gross, because in theory, the system could be directed to use the same key to run restores as well. Cryptographic protection thus gets reduced to protection by code.

Generally, encryption keys are not stored on backup media with the information that they protect since doing so is somewhat akin to locking a house and then putting the keys under the doormat. Yet, if the system doesn't store any information on the backup media, the recovery of data in case of disasters (such as a CommServe failure) will generally be extremely difficult if not impossible. Again, there is a tradeoff here between the overall security of the storage management system and the user's convenience. Thus, in some embodiment, key management on the backup media does occur.

For the key management on the media, there are a number of distinct security levels. The first is merely scrambling keys on the backup media. Due to its potential weaknesses as further described below, this method of media key management is referred to herein as MM_KM_WEAK throughout the rest of the document. One weakness to this method is that anyone able to figure out the scrambling algorithm (or anyone able to invoke unscrambling code) will be able to fully recover the backup media without any additional knowledge required. All the strengths of encryption algorithms employed by the system are thus likely nullified by this loophole. Yet, this scheme has some advantages, and some uses: (1) The user never has to remember or enter a pass-phrase. All backups/restores remain fully automatic, and the encryption is 100% transparent to the operator. (2) The data traveling over the pipeline is still encrypted and protected against interception by an eavesdropper. Thus, in some situations, MM_KM_WEAK may be desirable.

Another scheme is strong media key management ("MM_KM_STRONG"). In this embodiment, data encryption keys are stored on the media, but we additionally encrypt them with the user's pass-phrase. The pass-phrase becomes the crucial information that will exist only in the customer head, without which the data cannot generally be reconstructed by third party or even by an encrypted data recovery tool such as CommVault's Galaxy DrTool.

The final method of media key management is referred to herein as paranoid ("MM_KM_PARANOID"). In this case there are NO keys stored on the media at all. Data recovery without the CommServe database will generally be impossible and data recover tools such as DrTool will not work since the encrypted data on the media will not contain any additional information these tools require to decrypt and recover the data.

The tables below summarize various advantages and disadvantages of key management schemes on the storage manager and on backup media according to embodiments of the invention:

| CommServe key management. | | |
|---|---|---|
| Method | Advantages | Disadvantages |
| CS_KM_WEAK | No user interaction required to perform backups or restores. No pass-phrase to remember. The data is still securely protected in transit and on tape (as long as the media security is not MM_KM_WEAK) | The CommServe database becomes the most vulnerable place. Anyone who has access to it can recover the encryption key and restore any data. |
| CS_KM_STRONG | W/o user's pass-phrase it's impossible to recover the encryption keys and data even in the case if CommServe database becomes compromised. | User has to provide a pass-phrase during restores. The pass-phrase becomes the weakest link of the entire data protection scheme. |

| Media key management | | |
|---|---|---|
| Method | Advantages | Disadvantages |
| MM_KM_WEAK | No pass-phrase to remember in order to run DrTool. The data is still securely protected in transit in pipeline. | The data on tape becomes basically "scrambled". Anyone having the knowledge of the principles of the "scrambling" algorithm or knowing how to invoke it in Galaxy DLL can recover the data. |
| MM_KM_STRONG | Even though the data encryption key is stored on the media, it is protected by user's pass-phrase, w/o which the data is unrecoverable. DrTool can recover data. | While the data encryption keys are protected with the pass-phrase, the whole data protection scheme now becomes as week as this pass-phrase. This should be made very clear to the user. DrTool will ask user for pass-phrase. |
| MM_KM_PARANOID | There are no keys stored on the media. Having just the media it's completely impossible to recover any data from it. | Data recovery is impossible w/o Galaxy CommServe database. DrTool won't work. |

Besides the encryption key management/storage problem discussed above, there is also a key exchange problem: even if the keys are stored on the CommServe in a secure way, they generally must be somehow transferred to the IDA and MA—the places where the real data encryption or decryption generally takes place.

If the keys are distributed in a clear text form, they can easily be intercepted by an eavesdropper, and used later to restore backup data. This method is the least secure and should generally be avoided if possible.

If keys are distributed in "scrambled" form, the eavesdropper's task becomes more difficult, but still possible via the usual scrambling drawback. Once an entry point to the system's unscrambling routing is found and negotiated, for example to the Galaxy CvLib DLL, any scrambled message can be recovered.

If keys are distributed encrypted with some user's chosen password, the user would have to enter that password twice for each client/MA: once on the client itself, second time on the CommServe, so that the password would be stored somewhere in registry for further usage, and would never appear on the network. While providing an illusion of security, this third method is, however, potentially inconvenient for the user (too many passwords to enter), and the security gain is not that great: the passwords will have to be stored in file or registry anyway, and they can appear there only in the "scrambled" form (unless we ask user to enter yet another password, etc. etc.). Thus in some embodiments, a variant of this scheme uses an automatically chosen password that requires no user interaction and still yields a good security. For example, the system uses a session network password to encrypt encryption keys when they're sent between the machines. Each client computer has a unique session network password, and CommServe knows all these passwords, so they become a very good candidate for data key encryption before sending them over the network. Since IDAs and MAs don't know each other's network password, they cannot easily exchange keys, so, in some embodiments, it becomes the responsibility of the CommServe to generate random data encryption key and to pass it to IDA and/or MA—depending on where the encryption should take place.

This section describes various aspects of data encryption implementation according to embodiments of the invention, and relies upon the following variables:

| | |
|---|---|
| $D_i$ | i-th block of plaintext data |
| $E_i$ | i-th block of encrypted data |
| $K^{BF}$ | Blowfish encryption key |
| $K^{BF}_{enc}$ | Blowfish key encrypted with RSA public key. |
| $K^{BF}_{enc,db}$ | Blowfish key encrypted with RSA public key and converted to ASCII for storing in the CS database. |
| $K^{BF}_{netenc}$ | Blowfish key encrypted with network password for transmission over the network to IDA or MA. |
| $IV^{BF}$ | Initialization vector used in Blowfish CBC mode - unique 64-bit number distributed along with the $K^{BF}$. |
| $K^{RSApub}$ | RSA public key |
| $K^{RSApub}_{db}$ | RSA public key as it's stored in the CS database |
| $K^{RSApri}$ | RSA private key |
| $K^{RSApri}_{enc}$ | RSA private key encrypted with pass-phrase |
| $K^{RSApri}_{enc,db}$ | RSA private key encrypted with pass-phrase and converted to ASCII for storing in the CS database |
| PassPhrase | User-specified pass-phrase, or a built-in pass-phrase for CS_KM_WEAK or MM_KM_WEAK key management modes. |
| NetPass | Network password of a particular Galaxy machine |
| $BF(D_i, K^{BF})$ | Blowfish algorithm applied to block $D_i$ using key $K^{BF}$ |
| $RSA(D_i, K^{RSApub})$ | RSA algorithm applied to $D_i$ using $K^{RSApub}$ key. |
| $RSA^{-1}(E_i, K^{RSApri})$ | RSA algorithm applied to $E_i$ using $K^{RSApri}$ key. |
| $Scramble(D_i)$ | Data block Di converted to ASCII and scrambled (i.e. encrypted with some built-in key, probably randomized and protected by CRC32) |
| MD5(T) | MD5 hash function producing a 128-bit hash value of arbitrary length text T. It's used to reduce pass-phrase down to a 128-bit number, which can then be used as a key in Blowfish encryption. |

Thus, exemplary encryption schemes and methods according to embodiments of the invention can be represented as follows:

In some embodiments, the $K^{RSApri}$ key encrypted with a user-selectable pass-phrase according to this equation:

$$K^{RSApri}_{enc}=BF(K^{KRSApri},MD5(PassPhrase))$$

Before storing into the database it is scrambled and converted to ASCII:

$$K^{RSApri}_{enc,db}=Scramble(K^{RSApri}_{enc})$$

In some embodiments, during restores the $K^{RSApri}_{enc,db}$ key is decrypted back to $K^{RSApri}$ according to this formula:

$$K^{RSApri}=BF(Scramble^{-1}(K^{RSApri}_{enc,db}), MD5(PassPhrase))$$

In some embodiments, the $K^{RSApub}$ key is stored in the database in this scrambled ASCII format:

$$K^{RSApub}_{db}=Scramble(K^{RSApub})$$

And the reverse transformation is represented as follows:

$$K^{RSApub}=Scramble^{-1}(K^{RSApub}_{db})$$

In some embodiments, the backup data text is encoded as follows:

$$E_i BF(D_i, K^{BF}) \text{ ECB (Electronic Codeblock Mode)}$$

or $$E_0=BF(D_0 \otimes IV^{BF}, K^{BF}) \text{ CBC (Cipher Block Chaining Mode)}$$

$$E_i=BF(D_i \otimes E_{i-1}, K^{BF})$$

In some embodiments, during restores, the encoded data will be decrypted as follows:

$$D_i=BF(E_i, K^{BF}) \text{ ECB Mode}$$

or $$D_0=BF(E_0, K^{BF}) \otimes IV^{BF} \text{ CBCMode}$$

$$D_i=BF(E_i, K^{BF}) \otimes E_{i-1}$$

Before being stored into the database, the backup data key $K^{BF}$ (chosen randomly for every backup) is encrypted according to this formula in some embodiments:

$$K^{BF}_{enc}=RSA(K^{BR}, K^{RSApub})$$

In the database it is stored in the scrambled ASCII format in some embodiments:

$$K^{BF}_{enc,db}=Scramble(K^{BF}_{enc})$$

In some embodiments, during restores the $K^{BF}$ key will be recovered from the database according to this formula:

$$K^{BF}=RSA^{-1}(Scramble^{-1}(K^{BF}_{enc,db}), K^{RSApri})$$

And $K^{RSApri}$ is decrypted from $K^{RSApri}_{enc,db}$ as described above.

In some embodiments, before being transmitted from CS to IDA or MA, the $K^{BF}$ key is encrypted with the client's network password according to this formula:

$$K^{BF}_{netenc}=BF(K^{BF}, NetPass)$$

In some embodiments, the client obtains $K^{BF}$ from $K^{BF}_{netenc}$ using this formula:

$$K^{BF}=BF(K^{BF}_{netenc}.\text{NetPass})$$

There are three categories of encryption-related settings that are stored in the storage manager database/index cache:
1. The Blowfish data stream encryption key $K^{BF}_{enc,\,db}$—per archive file.
2. The RSA public keys ($K^{RSApub}_{db}$, $K^{RSApri}_{enc,\,db}$) and key management options—per client
3. Encryption flag (ENC_NONE, ENC_NETWORK_ONLY, ENC_MEDIA_ONLY, ENC_MEDIA_AND_NETWORK)—per subclient The $K^{BF}$ keys are generated randomly for every archive file. The $K^{RSApub}$ and $K^{RSApri}$ are created once per client. All subclients will share the same RSA keys, the same pass-phrase and the same key management settings. To be able to turn encryption ON/OFF individually for every subclient, the "encryption ON" flag should be stored per subclient.

Encryption settings and their related GUIs are generally split into two groups: those that are specified for the entire client computer, and those that can be customized on a per-subclient basis.

Figure 8:
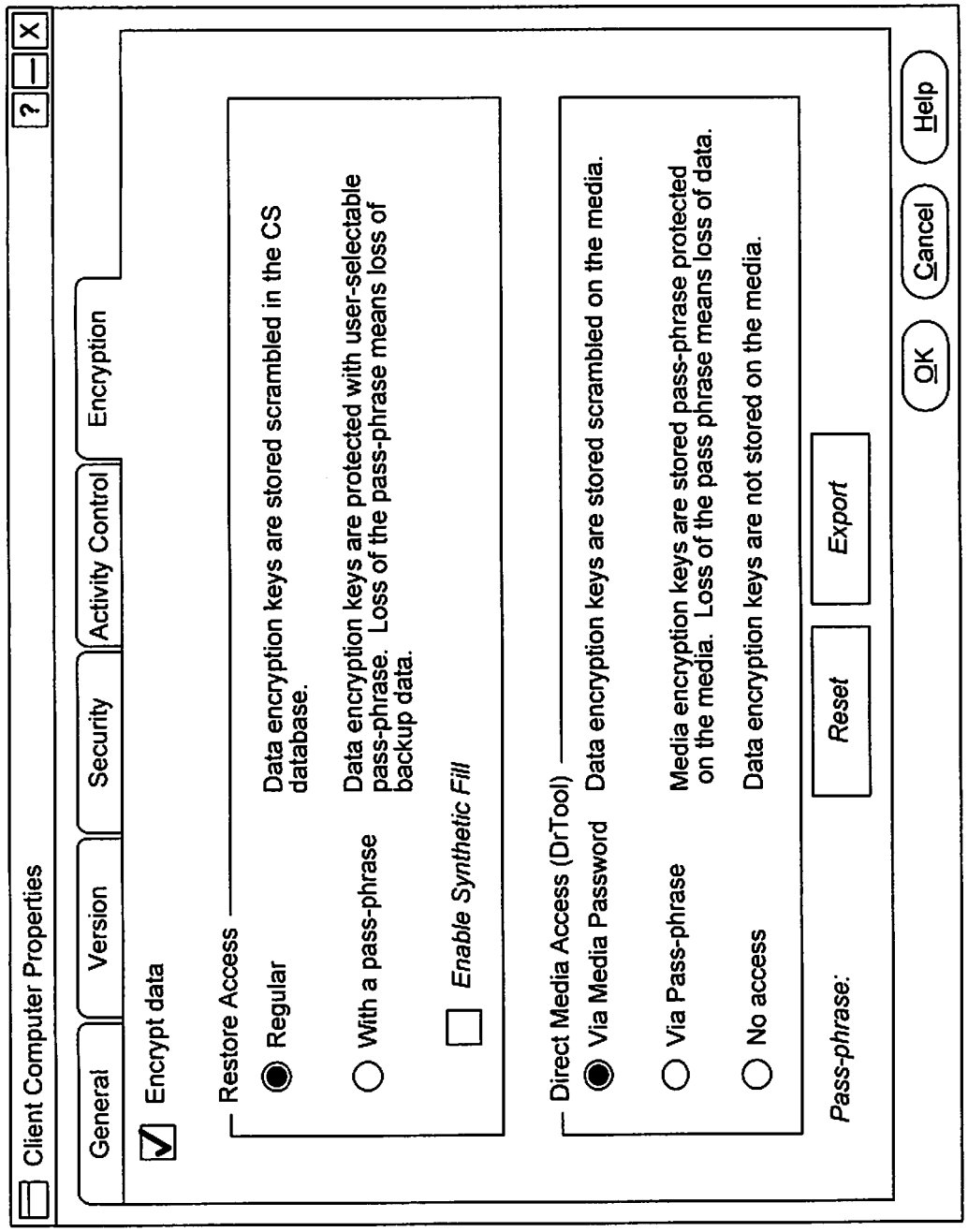
FIG. 8 depicts a screenshot of a user interface according to an embodiment of the present invention.

The settings specified for the entire client computer (all subclients) are summarized in the screenshot in FIG. 8. The screenshot contains the suggested names and layout of the controls that are presented to the user. As used herein, key management terminology in FIG. 8 corresponds as follows:
1. "Regular Restore Access" corresponds to CS_KM_WEAK
2. "Restore Access with a pass-phrase" corresponds to CS_KM_STRONG,
3. "Direct Media Access via Media Password" corresponds to MM_KM_WEAK,
4. "Direct Media Access via pass-phrase" corresponds to MM_KM_STRONG, and
5. "No Direct Media Access" corresponds to MM_KM_PARANOID.

When "Pass-phrase: <Export>" button is pressed in FIG. 8, a dialog box is displayed which allows the user to enter the pass phrase. The dialog box contains the list of all client computers configured on the CommServe. The default value is the name of the client for which the encryption settings are being edited. When "Pass-phrase: <Reset>" button is pressed in FIG. 8, a dialog box is displayed which allows the user to reset the pass phrase.

There is minimal space in the self describing multi-tag headers to specify additional information regarding the encryption functionality disclosed herein. In some embodiments, the system also uses a new header variable or field, but this results in a loss of compatibility with earlier clients.

Unlike compression, when encrypting data an expansion of the data size is possible and in some cases expected. For example, since the Blowfish algorithm is a block cipher, it will pad data to the block boundary (64 bits). Thus, it can add up to 7 bytes to data associated with every tag header. This padding is not an issue though because when backup data is put into the pipeline buffer, it's aligned on the boundary of 8. And since 64 bits constitute exactly 8 bytes, Blowfish will merely consume the unused alignment bytes, and no data expansion will occur. Unfortunately, lack of data expansion described above is true only for the simplest mode of Blowfish operation. If one implements a more secure CBC mode, or even just adds a 32-bit CRC32 checksum to guarantee data consistency, we will observe expansion of up to 4+8 bytes per tag header (CRC32+IV).

Current data pipeline code already implements a failsafe margin (at least 2 KB in some embodiments) used by the compression module during data compression (and released afterwards), so the same can be done for encryption as well. In fact, the encryption module uses the same margin, which is already there for compression. If user backs up a great deal of tiny files, there will be 12*N bytes expansion, where N is the number of tag headers that fit one pipeline buffer (32K). The 2 KB failsafe buffer will be exhausted if average file size is 96 bytes (32K/(size+96)*12=2K). Thus, the appropriate fall-back mechanism will have to be implemented in the encryption module, which would automatically allocate a new pipeline buffer, should this become necessary.

Each tag header will have a flag indicating whether the data has been encrypted or not. Since there is a 32-bit "compressed_data" flag already present in that structure, and that flag can take only values of 0 and 1, we can use the second byte of the integer to specify encryption algorithm to use. Other values of that byte can be reserved for encryption algorithms that may be implemented.

It may also be necessary to track the size of the data after it has been encrypted. For compression this is done by utilizing a second field of the tag header. For encryption another field out of the tag header is allocated for this purpose, or the compressed size replaced with the encrypted size and save the compressed size in an encryption header that would follow every tag header.

The system also uses chunk trailers from the data pipeline to store encryption information. Every chunk is followed by a chunk trailer that contains information about archive files encoded in the chunk. This information is used by data recovery tools, such as DrTool, to recover data in the absence of the CommServe database. For example, in some embodiments, the Chunk Trailer is the natural place where encryption keys can be stored to allow DrTool successfully decrypt the data without contacting the CS for the $K^{BF}$.

In some embodiments, the Chunk Trailer is an ASCII entity comprised of two columns (one for variable names, the other one for the values). Depending on the media key management security level, the following information may be stored in the Chunk Trailer:

| Parameter | Description |
| --- | --- |
| Cipher | An integer identifying the cipher that was used to encrypt backup data:<br>0 - Data is not encrypted<br>1 - Data is encrypted with Blowfish |
| BFKey | Blowfish key encrypted with RSA public key |
| RSAPriKey | RSA private key encrypted with the user or built-in pass-phrase |
| RSAUserPassPhrase | A flag (taking the values of 0 or 1) specifying whether the RSAPriKey is encrypted with user pass-phrase (1) or a built-in pass-phrase (0). |

In the course of a backup, the following encryption-related events generally occur. Note that encryption can take place on a data agent or a media agent. Moreover, if network encryption is ON, but media encryption is OFF (ENC_NETWORK_ONLY), decryption may be happening as well:
1. The system initiates a request to initialize encryption modules in the data pipeline. For example, CvArchive on IDA sends CVA_GET_PIPELINEINFO_REQ to the ArchiveManager and gets back encryption settings for the specified appId (subclient). These encryption settings are used to initialize INIT_PL buffer dispatched down the pipeline.

2. An encryption module, for example, CvDataPipe, analyses the encryption settings in the INIT_PL buffer and brings up encrypt/decrypt modules on the IDA or MA as needed
3. The system generates a new encryption key associated with a new archive file that is to be created. For example, CvArchive sends CVA_ALLOC_AFILEID_REQ to ArchiveManager as part of creating a new archive file. ArchiveManager generates a new random Blowfish key $K^{BF}$ and stores it in its memory.
4. The encryption key is propagated to the appropriate encryption modules. For example, CvArchive sends PL_FS_CREATE_AFILE down the pipeline. "encrypt" and "decrypt" modules intercept this buffer and request archive file encryption key $K^{BF}$ from ArchiveManager via CVA_GET_AFILE_BACKUP_KEY. ArchiveManager returns the temporary key that was generated in the previous step.
5. Backup data is being sent through the pipeline and "encrypt" and "decrypt" modules process it as needed: For example, every PL_DATA buffer (tag_header_t::buf_type==PL_DATA) is encrypted, and encryption flag is set in the tag_header_t or other field as appropriate.
6. The chunk trailer is propagated with information regarding encryption and other actions that were taken on the chunk. For example, when it's time to close the current chunk, DataMover sends CVA_GET_CLOSE-CHUNKINFO_REQ to ArchiveManager, gets $K^{BF}_{enc,\,db}$ and $K^{RSApri}_{enc,\,db}$ for every archive file in the chunk, and stores them in the chunk trailer.
7. The archive file encryption key is stored for future use. For example, when it's time to close an archive file, DataMover sends CVA_FIN_AFILE_COPY_REQ to the ArchiveManager. ArchiveManager encrypts the temporary $K^{BF}$ for this archive file with the client's $K^{RSApub}$, stores the result into archFile table, and purges temporary $K^{BF}$ from memory.

The following events generally occur in a restore operation:

1. The system, depending on whether strong or weak key encryption is used, checks to determine whether a pass phrase is required. If a pass phrase is required the system determines whether the phrase has been provided. For example, CvArchive checks whether pass-phrase was specified by user when he initiated restore, and whether this pass-phrase was passed to CvArchive via restore parameters.
2. In some embodiments, the system check for pass-phrase export files if no pass-phrase is provided. For example, if user didn't specify any pass-phrase, CvArchive browses pass-phrase export files in a Galaxy directory on IDA (e.g. /opt/galaxy/PF) looking for the file that would correspond to the current appId (pass-phrase will be stored together with the client ID that they correspond to, and client ID can be derived from the appId if needed).
3. The restore archive process sends the archive manager the passphrase. For example, in some embodiments CvArchive sends CVA_GETPIPELINEINFO_FOR_RESTORE_REQ to the ArchiveManager, and includes the pass-phrase, if it was located in the previous two steps.
4. The archive manager attempts to unlock the private key. For example, in some embodiments, the ArchiveManager process tries to unlock RSA private key $K^{RSApri}$ as per the following algorithm:
    a. If rsaPriKeyBPF for this subclient is not empty in the clientEnc table, ArchiveManager decrypts rsaPriKeyBPF using the built-in pass-phrase.
    b. If rsaPriKeyUPF for this subclient is not empty in the clientEnc table, ArchiveManager decrypts rsaPriKeyUPF using the pass-phrase supplied by CvArchive.
    c. If $K^{RSApri}$ was obtained in the previous steps, it's stored in ArchiveManager's memory for the duration of the restore.
5. The encrypt and decrypt modules are initiated. For example, CvArchive causes CvDataPipe to bring up encrypt/decrypt modules ("encrypt" on the MA and "decrypt" on the IDA). Note that like compress/uncompress, these modules will be brought up every time when restore runs. Whether they actually do something or not will be determined during the restore itself.
6. Buffers are allocated to archive files being restored. For example, in some embodiments, for every archive file being restored, fsRestoreHead sends new PL_FS_OPEN_AFILE buffer down the pipeline.
7. The decrypt/encrypt modules retrieve the appropriate key to process the archive file buffers. For example, the decrypt/encrypt modules intercept this buffer and issue CVA_GET_AFILE_RESTORE_KEY to ArchiveManager in order to retrieve $K^{BF}$ for this archive file.
8. ArchiveManager does the following:
    a. If there is already a decrypted $K^{BF}$ in memory for this archive file (as a result of a previous CVA_GET_AFILE_RESTORE_KEY request), it's returned immediately.
    b. If archFile.dataEncKey!=NULL for this archive file (data is encrypted on media), the $K^{BF}$ is obtained by decrypting archFile.dataEncKey with the KRSApri that was unlocked during pipeline setup. If $K^{RSApri}$ wasn't unlocked because user or CvArchive didn't specify a pass-phrase, ArchiveManager should issue an event message saying that a pass-phrase is required, and should abort the restore.
    c. If archive file is not encrypted on the media, but subclient's network encryption is ON, a random $K^{BF}$ is generated and is stored in memory.
9. Depending on whether $K^{BF}$ returned from ArchiveManager was dynamically generated or not, "encrypt" module either encrypts passing data or sends it unchanged (if the key wasn't generated dynamically, it means that the data is already encrypted on the media, so it can be sent across the network w/o extra encryption).
10. "decrypt" module decrypts every tag data that has encryption flag set in the tag header.
11. The encryption key is removed from memory at the end of the archive file restore. For example, at the end of archive file restore, fsRestoreHead sends via CvArchive CVA_FORGET_AFILE_RESTORE_KEY to the ArchiveManager, which causes it to forget the $K^{BF}$ for the current archive file.
12. At the end of restore, fsRestoreHead sends via CvArchive CVA_FORGET_RSAPRI_KEY to ArchiveManager causing it purge $K^{RSApri}$ from memory.

The following sequence occurs during disaster recovery operations, for example, when the storage manager is unavailable or at other times:

1. While doing the initial media scan, DrTool should read chunk trailers and include encryption-related parameters in the structure, which are then returned to the middle layer:

a. Let cipher=Cipher (or FALSE, if Cipher is missing)
b. Let bfKeyEnc=BFKey (or NULL, if BFKey is missing)
c. Let rsaPriKeyUPF=RSApriKey (or NULLm if BFKey is missing)
d. Let rsaPassPhraseNeeded=RSAUserPassPhrase (or FALSE, if missing)
2. Middle layer should store the encryption parameters (cipher, bfKeyEnc, rsaPriKeyUPF and rsaPassPhraseNeeded) in the CTree database along with other archive file-related settings.
3. When doing the real restore, the middle or GUI layer of DrTool should do the following:
a. Compile the list of archive files that have to be restored
b. For every archive file in the list:
 i. If cipher==FALSE, skip the following steps
 ii. If bfKeyEnc==NULL, skip the following steps
 iii. If rsaPassPhraseNeeded==TRUE, prompt user for a pass-phrase and let passPhrase be what user enters. Otherwise let passPhrase be the built-in pass-phrase.
 iv. Decrypt rsaPriKeyUPF using the passPhrase from the previous step to obtain rsaPriKey.
 v. Decrypt bfKeyEnc using rsaPriKey to obtain bfKey
c. For every new archive file being open during restore:
 i. If cipher==FALSE, skip the following steps
 ii. If bfKey==NULL abort with "Encrypted data is not recoverable" error
 iii. For every tag_header_t from this archive file,
  1. If second byte of tag_header_t::compressed_data is 0, do nothing
  2. Otherwise decrypt tag data using bfKey In some embodiments, the system employs an encryption API on top of OpenSSL, for example, CommVault's CvDataCrypt API, that implements appropriate format of tag data encryption, scrambling, etc.

All keys are generally converted to ASCII form before storing them in the database.

The scrambler function randomizes the binary data, computes checksum, and encrypts the whole thing using some built-in key.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

We claim:

1. A computer-implemented method, to be performed by at least one hardware processor, for storing data for a user, the method comprising:
when storing data for the user:
 generating an encryption key associated with the data for the user;
 encrypting the data for the user using the generated encryption key to create encrypted data;
 storing the encrypted data in a data center associated with a third party;
 encrypting the encryption key to create an encrypted encryption key, wherein a password or other information set by the user is required to decrypt the encrypted encryption key; and
 storing, by the at least one hardware processor, the encrypted encryption key,
  wherein the encrypted encryption key is accessible to allow the encrypted data stored in the data center to be restored during a subsequent restore operation;
  wherein the password or other information for decrypting the encrypted encryption key is set by the user without knowledge of the third party, and
  wherein the third party is unable to decrypt the encrypted data stored in the data center without first receiving the password or other information from the user.

2. The method of claim 1, wherein the method is performed in a pipeline storage system comprising multiple processes arranged in stages including an encryption process, and wherein encrypting the data is performed by the encryption process.

3. The method of claim 1, further comprising restoring the encrypted data stored in the data center using the password or other information for decrypting the encrypted encryption key, wherein the password or other information for decrypting the encrypted encryption key is contained in a file kept on a data agent belonging to and controlled by the user, and wherein restoring the encrypted data is performed by a restore process which uses the password or other information contained in the file to decrypt the encrypted encryption key.

4. The method of claim 1, wherein storing the encrypted encryption key comprises storing the encrypted encryption key on a storage medium in the data center where the encrypted data is stored.

5. The method of claim 1, wherein the method is performed in a pipeline storage system, wherein the method comprises storing on a first storage device an index of storage media used by the pipeline storage system, and wherein storing the encrypted encryption key comprises storing the encrypted encryption key on the first storage device.

6. The method of claim 1, wherein the method is performed in a pipeline storage system, wherein the pipeline storage system includes a storage management component, and wherein storing the encrypted encryption key comprises storing the encryption key on the storage management component.

7. The method of claim 1, further comprising
inserting a tag in the encrypted data indicating that the encrypted data is encrypted, and
inserting the encrypted encryption key in the tag in the encrypted data.

8. The method of claim 1, further comprising inserting a tag in the encrypted data indicating that the encrypted data is encrypted.

9. A storage management system for storing data for a user, the system comprising:
- means for generating an encryption key associated with data for the user;
- means for encrypting the data belonging to the user using the generated encryption key to create encrypted data;
- means for storing the encrypted data in a data center associated with a third party;
- means for encrypting the encryption key to create an encrypted encryption key such that a password or other information set by the user is required to decrypt the encrypted encryption key; and
- means for storing the encrypted encryption key such that the encrypted encryption key is accessible to allow the encrypted data stored in the data center to be restored during a subsequent restore operation;
    - wherein the system is configured such that the password or other information for decrypting the encrypted encryption key is set by the user without knowledge of the third party, and
    - wherein the third party is unable to decrypt the encrypted data stored in the data center without receiving the password or other information from the user.

10. The system of claim 9, further comprising means for restoring the encrypted data stored in the data center using the password or other information for decrypting the encrypted encryption key, wherein the password or other information for decrypting the encrypted encryption key is contained in a file kept on a data agent, and wherein the means for restoring the encrypted data includes a restore process which uses the password or other information contained in the file to decrypt the encrypted encryption key.

11. The system of claim 9, wherein the system includes a pipeline storage system, wherein a first storage device stores an index of storage media used by the pipeline storage system, and wherein the encrypted encryption key is stored on the first storage device.

12. The system of claim 9, wherein the system includes a pipeline storage system, wherein the pipeline storage system includes a storage management component, and wherein the encryption key is stored on the storage management component.

13. The system of claim 9, further comprising
- means for inserting a tag in the encrypted data indicating that the encrypted data is encrypted, and
- means for inserting the encrypted encryption key in the tag in the encrypted data.

14. The system of claim 9, further comprising means for inserting a tag in the encrypted data indicating that the encrypted data is encrypted.

15. A non-transitory computer-readable medium having instructions which, when executed by a processor of a data storage system, cause the data storage system to perform a method for storing data for a user, the method comprising:
- generating an encryption key associated with data for the user;
- encrypting the data belonging to the user using the generated encryption key to create encrypted data;
- storing the encrypted data in a data center associated with a third party;
- encrypting the encryption key to create an encrypted encryption key, wherein a password or other information set by the user is required to decrypt the encrypted encryption key; and
- storing the encrypted encryption key, wherein the encrypted encryption key is accessible to allow the encrypted data stored in the data center during a subsequent restore operation;
    - wherein the password or other information for decrypting the encrypted encryption key is set by the user without knowledge by the third party, and
    - wherein the third party is unable to decrypt the encrypted data stored in the data center without first receiving the password or other information from the user.

16. The non-transitory computer-readable medium of claim 15, wherein the method further comprises restoring the encrypted data stored in the data center using the password or other information for decrypting the encrypted encryption key, wherein the password or other information for decrypting the encrypted encryption key is contained in a file kept on a data agent, and wherein restoring the encrypted data is performed by a restore process which uses the password or other information contained in the file to decrypt the encrypted encryption key.

* * * * *

UNITED STATES PATENT AND TRADEMARK OFFICE
CERTIFICATE OF CORRECTION

PATENT NO. : 8,429,428 B2
APPLICATION NO. : 12/796007
DATED : April 23, 2013
INVENTOR(S) : Paul Ignatius et al.

It is certified that error appears in the above-identified patent and that said Letters Patent is hereby corrected as shown below:

On Title page 3, in column 1, under "OTHER PUBLICATIONS", line 19, delete "SIGPOPS," and insert -- SIGOPS, --, therefor.

In the Drawings:

On sheet 10 of 13, in FIG. 5B, line 10, delete "Predcessor" and insert -- Predecessor --, therefor.

In the Specifications:

In column 6, line 27, delete "discernable" and insert -- discernible --, thereof.

In column 7, line 12-13, delete "scaleability" and insert -- scalability --, thereof.

In column 11, line 2, after "performed" delete "done".

In column 15, line 23, after "etc." delete "etc.".

In column 15, line 52, after "cache)" insert -- . --.

In column 15, line 57, delete "customers" and insert -- customer's --, thereof.

In column 20, line 2, after "CRC32" insert -- . --.

In column 20, line 52, delete "$K^{BR}$" and insert -- $K^{BF}$ --, thereof.

In column 21, line 11, after "client" insert -- . --.

In column 21, line 14, after "subclient" insert -- . --.

Signed and Sealed this
Twenty-fourth Day of September, 2013

Teresa Stanek Rea
*Deputy Director of the United States Patent and Trademark Office*

In column 21, line 31, after "WEAK" insert -- . --.

In column 23, line 4, after "needed" insert -- . --.

In column 25, line 16, after "steps" insert -- . --.

In column 25, line 17, after "steps" insert -- . --.

In column 25, line 24, after "steps" insert -- . --.